United States Patent
Park et al.

(10) Patent No.: US 11,025,767 B2
(45) Date of Patent: Jun. 1, 2021

(54) MOBILE TERMINAL AND CONTROL METHOD THEREFOR

(71) Applicant: LG ELECTRONICS INC., Seoul (KR)

(72) Inventors: Junkyeong Park, Seoul (KR); Minkyoung Bae, Seoul (KR); Ingu Kang, Seoul (KR); Junghyun Lee, Seoul (KR); Byungjung Jang, Seoul (KR); Jungsun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 263 days.

(21) Appl. No.: 15/775,631

(22) PCT Filed: Jan. 20, 2016

(86) PCT No.: PCT/KR2016/000561
§ 371 (c)(1),
(2) Date: May 11, 2018

(87) PCT Pub. No.: WO2017/082472
PCT Pub. Date: May 18, 2017

(65) Prior Publication Data
US 2018/0332163 A1    Nov. 15, 2018

(30) Foreign Application Priority Data
Nov. 12, 2015    (KR) .................. 10-2015-0159179

(51) Int. Cl.
*G06F 3/0485* (2013.01)
*G06F 3/0484* (2013.01)
(Continued)

(52) U.S. Cl.
CPC ...... *H04M 1/72427* (2021.01); *G06F 1/1626* (2013.01); *G06F 1/1652* (2013.01);
(Continued)

(58) Field of Classification Search
CPC .............. G06F 3/04815; G06F 3/0484; G06F 3/04842; G06F 3/04845; G06F 3/0485
See application file for complete search history.

(56) References Cited

U.S. PATENT DOCUMENTS 8,875,022 B2 * 10/2014 Yun ...................... G06F 3/0481
715/716
9,412,203 B1 * 8/2016 Garcia, III ............ G06T 19/006
(Continued)

FOREIGN PATENT DOCUMENTS

| JP | 2011-33983 A | 2/2011 |
|---|---|---|
| KR | 10-2011-0122981 A | 11/2011 |
| KR | 10-2015-009016 A | 1/2015 |
| KR | 10-1553503 B1 | 9/2015 |

*Primary Examiner* — Ting Z Lee
(74) *Attorney, Agent, or Firm* — Birch, Stewart, Kolasch & Birch, LLP

(57) ABSTRACT

A mobile terminal including a display unit configured to display an image of which the viewing angle is changeable; and a controller configured to change the viewing angle of the displayed image in response to a user viewing change input, in response to a user selection of a first object included in the image, automatically change the viewing angle of the image such that the first object included in the image is continuously displayed on the display unit while the viewing angle is changed.

20 Claims, 33 Drawing Sheets

(51) Int. Cl.
*G06F 3/0481* (2013.01)
*H04M 1/72427* (2021.01)
*H04M 1/72403* (2021.01)
*G06F 1/16* (2006.01)
*G06F 3/14* (2006.01)

(52) U.S. Cl.
CPC .......... *G06F 3/0484* (2013.01); *G06F 3/0485* (2013.01); *G06F 3/04815* (2013.01); *G06F 3/04842* (2013.01); *G06F 3/04845* (2013.01); *G06F 3/1407* (2013.01); *H04M 1/72403* (2021.01); *G06F 2200/1614* (2013.01); *G09G 2320/028* (2013.01); *H04M 2201/42* (2013.01); *H04M 2250/22* (2013.01); *H04M 2250/52* (2013.01)

(56) References Cited

U.S. PATENT DOCUMENTS

| | | | |
|---|---|---|---|
| 2002/0171642 A1* | 11/2002 | Gottesman | G06T 19/003 345/419 |
| 2009/0241037 A1* | 9/2009 | Hyndman | H04L 65/4015 715/757 |
| 2010/0173678 A1* | 7/2010 | Kim | H04N 5/23216 455/566 |
| 2010/0287493 A1* | 11/2010 | Majumder | G06F 3/0481 715/788 |
| 2012/0062549 A1* | 3/2012 | Woo | G06F 3/04815 345/419 |
| 2015/0007016 A1 | 1/2015 | Lee et al. | |

* cited by examiner

MOBILE TERMINAL AND CONTROL METHOD THEREFOR

CROSS-REFERENCE TO RELATED APPLICATIONS

This application is the National Stage filing under 35 U.S.C. § 371 of International Application No. PCT/KR2016/000561, filed on Jan. 20, 2016, which claims the benefit of earlier filing date and right of priority to Korean Application No. 10-2015-0159179, filed on Nov. 12, 2015, the contents of which are all hereby incorporated by reference herein in their entirety.

TECHNICAL FIELD

The present invention relates to a mobile terminal capable of outputting an image, and a method of controlling the same.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports electric game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

With development of a Virtual Reality (VR) technology, contents which can be reproduced while freely setting a viewing angle of an image or video image are currently used. However, when such contents are used in a terminal, it is inconvenient that the user has to apply a gesture to the terminal to set the viewing angle. Also, various viewpoints of an image cannot be checked at the same time, and the same viewpoint of the image is difficult to be shared even when the image is transmitted to another terminal.

Efforts are ongoing to support and increase the functionality of mobile terminals. Such efforts include software and hardware improvements, as well as changes and improvements in the structural components.

SUMMARY OF THE INVENTION

The present invention is directed to solving the aforementioned problems and other drawbacks. Another aspect of the present invention is to provide a mobile terminal, capable of manually setting a viewing angle of an image and also automatically setting a viewing angle of an image in response to tracking an object existing in the image, and a method of controlling the same.

According to an aspect of the present invention, to achieve the above and other aspects, there is provided a mobile terminal, including a display unit to output, with respect to a preset viewing angle, a portion of an image of which the viewing angle is changeable within a preset range, and a controller to output, with respect to a first viewing angle, a first portion of the image in response to a preset user input being applied, and change the viewing angle such that a portion associated with an object included in the image is output, in response to a preset user input for selecting the object being applied.

In an embodiment, the controller may change the viewing angle of the image, in response to a preset touch input being applied to an icon for changing the viewing angle of the image.

In an embodiment, the controller may automatically change the viewing angle of the image such that a portion A of the image including a first object is output, in response to a preset user input for selecting the first object being applied.

In an embodiment, the controller may terminate the output of the portion A, in response to the first object being output in a preset size or less while the portion A is output.

In an embodiment, the controller may automatically change the viewing angle of the image such that a portion B of the image including a second object different from the first object is output, in response to a preset user input for selecting the second object being applied.

In an embodiment, the controller may display a reproduction time corresponding to the portion A on a reproduction bar of the image.

In an embodiment, the controller may split the display unit in a preset manner, in response to a preset user input for selecting the first object being applied, and output the first portion and the portion A in the split regions, respectively.

In an embodiment, the controller may output the portion A on an upper layer of the first portion, which is being output on an entire region of the display unit, in response to a preset user input for selecting the first object being applied.

In an embodiment, the controller may change an output position of the upper layer or a size of the upper layer, in response to a preset touch input being applied to the upper layer.

In an embodiment, the controller may zoom in or out the portion A, in response to a preset touch input being applied to the upper layer.

In an embodiment, the controller may output a portion of the image with respect to a changed viewing angle on a region where the first portion is currently output, in response to a preset user input for changing the viewing angle being applied.

In an embodiment, the controller may output a plurality of icons corresponding to a plurality of objects included in the image, respectively, and output a portion of the image including an object corresponding to at least one of the plurality of icons, in response to a preset touch input being applied to the at least one icon.

In an embodiment, the controller may calculate a region associated with the first object based on at least one of a gaze direction, a head direction, a body direction and a pointing direction of the first object, in response to a preset user input being applied, and change the viewing angle of the image such that a portion of the image including the calculated region is output.

In an embodiment, the controller may calculate an object associated with the first object based on at least one of the gaze direction, the head direction, the body direction and the pointing direction of the first object, in response to a preset user input being applied, and automatically change the viewing angle of the image such that a portion of the image including the object is output.

In an embodiment, the controller may output an angle state bar indicating a change in the viewing angle of the first portion, and change the viewing angle of the first portion, in response to a preset touch input being applied to the angle state bar.

According to another aspect of the present invention, there is provided a method for controlling a mobile terminal, the method including (a) outputting, with respect to a preset viewing angle, a portion of an image of which the viewing angle is changeable within a preset range, (b) outputting, with respect to a first viewing angle, a first portion of the image in response to a preset user input being applied, and (c) changing the viewing angle of the image so that a portion associated with an object included in the image is output, in response to a preset user input for selecting the object being applied.

In an embodiment, the step (b) may include changing the viewing angle of the image, in response to a preset touch input being applied to an icon for changing the viewing angle of the image.

In an embodiment, the step (c) may include automatically changing the viewing angle of the image such that a portion A of the image including a first object is output, in response to a preset user input for selecting the first object being applied.

In an embodiment, the step (c) may include terminating the output of the portion A, in response to the first object currently output on the portion A being output in a preset size or less.

In an embodiment, the step (c) may include automatically changing the viewing angle of the image such that a portion B of the image including a second object different from the first object is output, in response to a preset user input for selecting the second object being applied.

Hereinafter, effects of a mobile terminal and a method of controlling the same according to the present invention will be described.

According to at least one of embodiments of the present invention, a viewing angle of an image can be set simply and easily.

Further, according to at least one of embodiments of the present invention, a viewing angle of an image can be automatically changed based on a specific object (object). This may result in overcoming inconvenience in having to set a viewing angle of an image in detail.

Then, a portion of the image with respect to a set viewing angle can be stored, reproduced or transmitted as a general image. As a result, a specific viewpoint with respect to the image can be shared.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
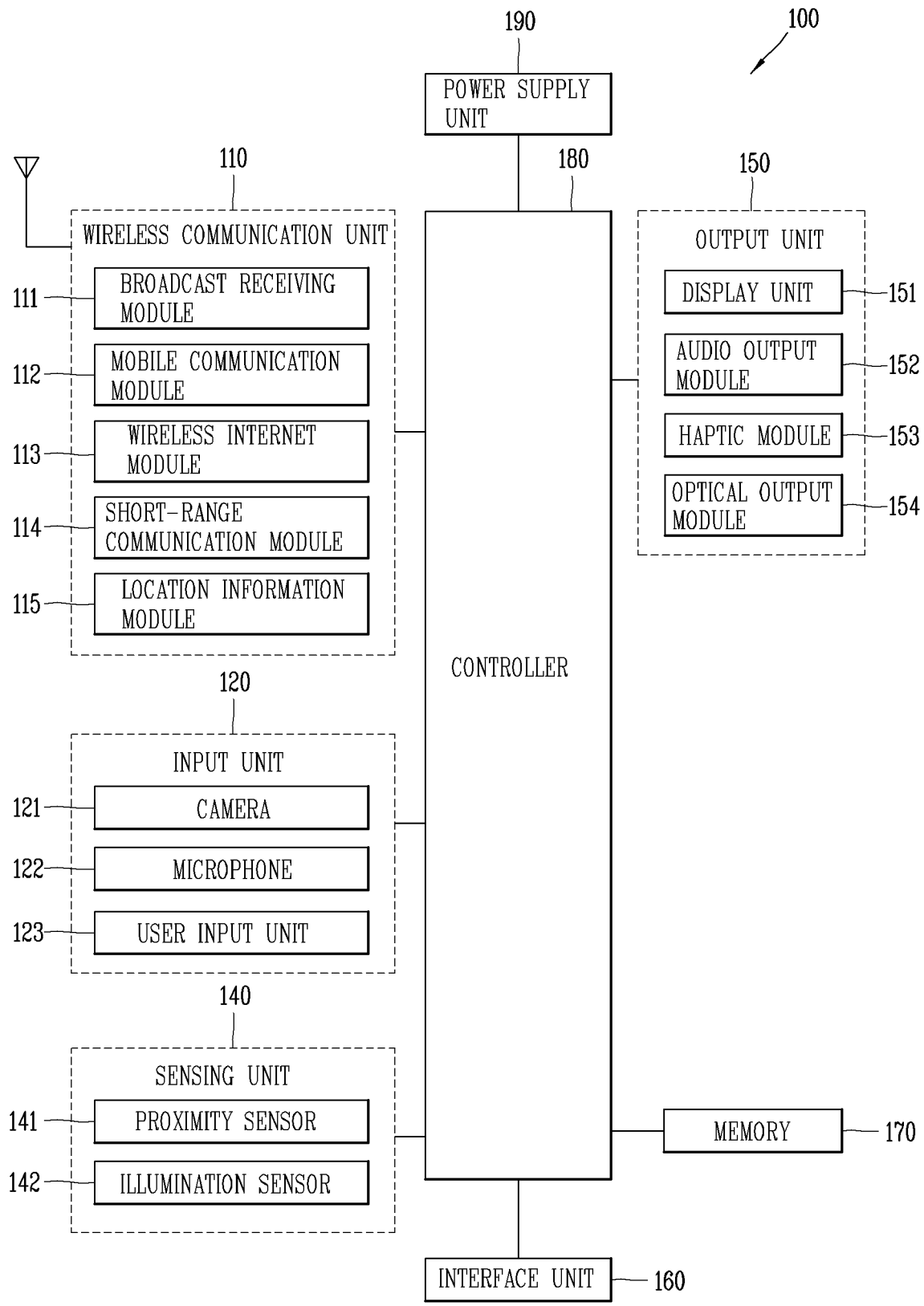
FIG. 1A is a block diagram of a mobile terminal in accordance with one exemplary embodiment of the present invention.
Figure 1B:
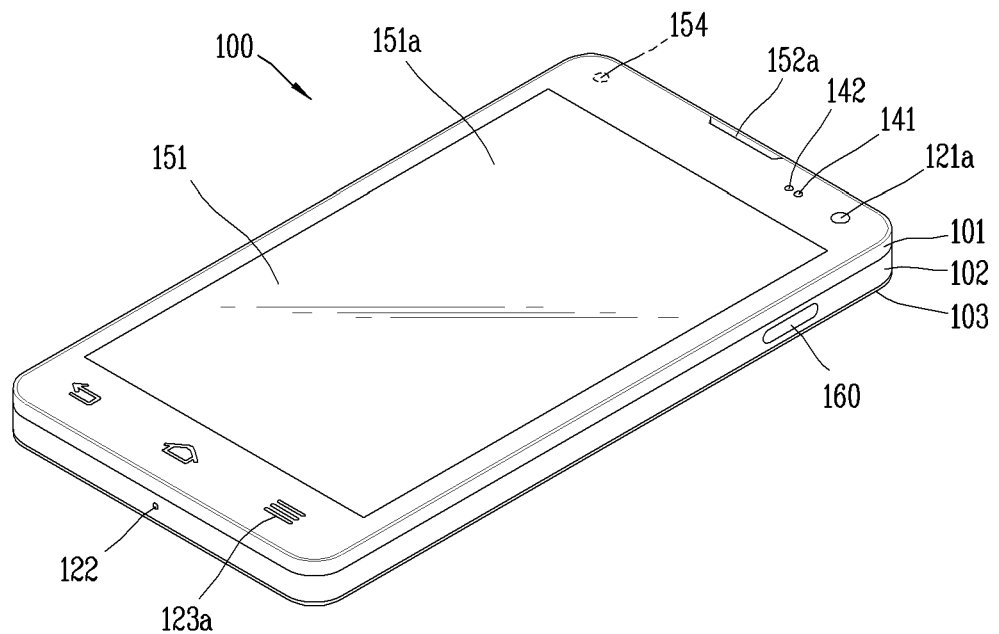
FIGS. 1B and 1C are conceptual views illustrating one example of a mobile terminal according to the present invention, viewed from different directions.
Figure 1C:
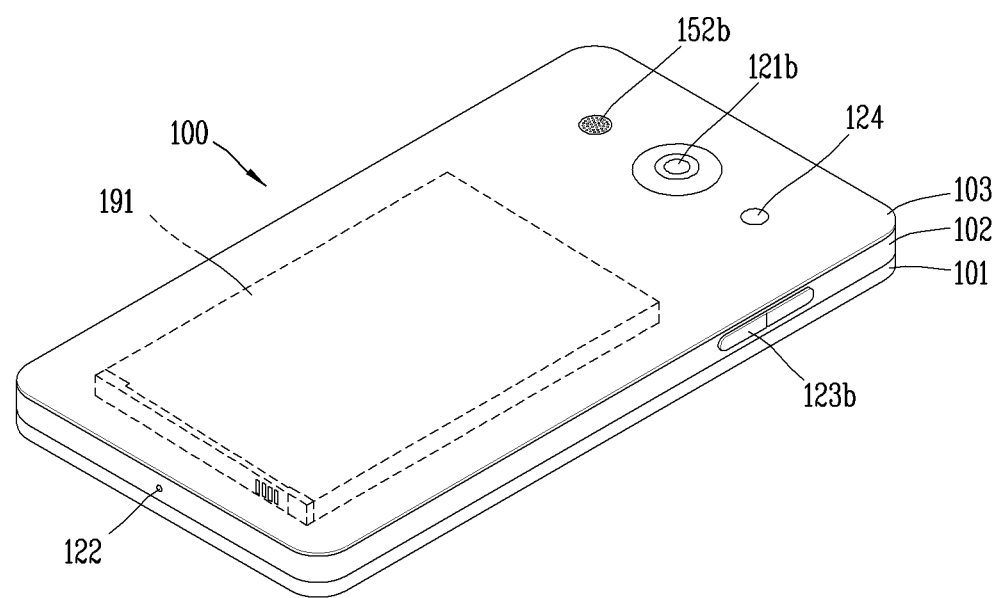

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining an image signal, a microphone 122 or an audio input unit for inputting an audio signal, and a user input unit 123 (for example, a touch key, a mechanical key, and the like) for allowing a user to input information. Audio data or image data collected in the input unit 120 may be analyzed and processed as a user's control command.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, or tactile information. The output unit 150 may be shown having at least one of a display unit 151, an audio output module 152, a haptic module 153, and an optical output module 154. The display unit 151 may have an interlayered or integral structure with a touch sensor so as to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

For instance, the memory 170 may be configured to store data supporting various functions. The memory 170 may store application programs (or applications) executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel and a terrestrial channel. Two or more broadcast receiving modules may be provided in the mobile terminal 100 to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 is a module for wireless Internet access and may be provided inside or outside the mobile terminal 100. The wireless Internet module 113 is a module for transmitting and receiving wireless signals in a communication network according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. The short-range wireless communication networks may be wireless personal area networks.

Here, another mobile terminal 100 may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, the mobile terminal may acquire a position of the mobile terminal based on information of a wireless access point (AP) that transmits or receives a wireless signal with the Wi-Fi module when utilizing the Wi-Fi module. Optically, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function (or an application program) being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

Meanwhile, the touch sensor may be configured to detect the touch input using different methods in the activated and deactivated states of the display unit 151. In this instance, the different method may be related to an activation period of the touch sensor. More specifically, the touch sensor may be activated at a different period according to whether the display unit 151 has been activated or not. That is, the touch sensor may have a different activation period according to whether the display unit 151 has been activated or not, and may sense a touch input applied thereto.

For instance, in a deactivated state of the display unit 151, the touch sensor may be activated with a preset period. In this instance, the preset period may be a time period more than 0. Further, in an activated state of the display unit 151, the touch sensor may be always operated in an activated state. In this instance, an activation period of the touch sensor may be '0' or a value very close to '0'.

Whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. Further, if a power consumption amount of the touch sensor exceeds the preset value based on '0', it may be determined that the touch sensor is in an activated state.

If the display unit 151 is in an activated state (hereinafter, will be referred to as an active mode), the touch sensor may wait for touch inputs onto the display unit 151, while maintaining an activated state. Further, if the display unit 151 is in a deactivated state (hereinafter, will be referred to as a doze mode), the touch sensor may be activated at preset periods.

When the preset period of the touch sensor is shorter, a sensing speed with respect to touch inputs applied onto the display unit 151 is higher. However, in this instance, a power consumption amount of the touch sensor may be increased. In contrast, when the preset period of the touch sensor is longer, a sensing speed with respect to touch inputs applied onto the display unit 151 may be lower, while a power consumption amount of the touch sensor is decreased.

Thus, the preset period may be set so that a sensing speed with respect to taps applied onto the display unit 151 is high enough not to be recognized by a user, and so that power consumption can be reduced. For instance, the preset period may be set so that the touch sensor in a deactivated state can be activated about 20 times (1 Hz) per second.

While the display unit 151 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the display unit 151, by several times. That is, the touch sensor may be activated with a different period, according to whether the display unit 151 is in an activated state or a deactivated state.

In a doze mode where the display unit 151 is in a doze state and the touch sensor is periodically activated, if a preset touch input (e.g., a first touch input and a second touch input consecutively knocking-on a predetermined region within a predetermined time) is sensed by the touch sensor, the controller 180 can convert the doze mode into an active mode where the flexible display unit and the touch sensor are activated.

The touch sensor may be driven at a different period based on a state of the display unit 151. For instance, when the display unit 151 is in a closed state, a doze mode may be executed. Further, when a closed state is converted into an open state, an active mode may be executed.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the mobile terminal 100 may include a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia playback sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

On the other hand, the mobile terminal may extend to a wearable device to be wearable on a human body, beyond the typical use of a user grasping the terminal with a hand. These wearable devices include smart watches, smart glasses, and head mounted displays (HMDs). Hereinafter, examples of mobile terminals extended to the wearable device will be described.

The wearable device is able to exchange (or interlock) data with another mobile terminal 100. The short-range communication module 114 may sense or recognize the wearable device, which can perform communication with the mobile terminal 100, around the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

Figure 2:
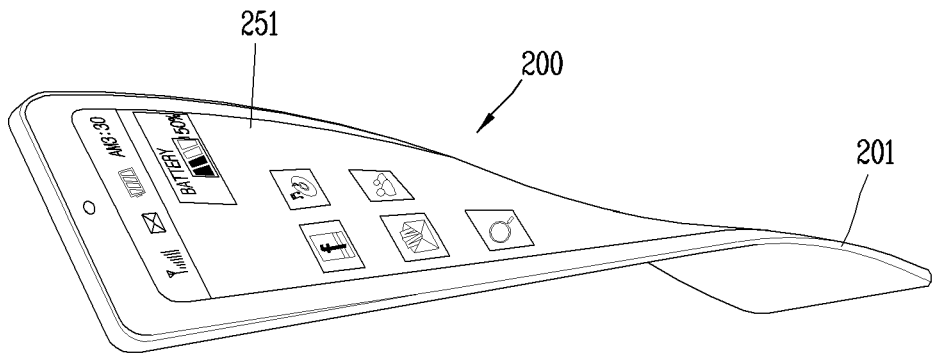
FIG. 2 is a perspective view illustrating an example of a glass type mobile terminal according to another embodiment of the present invention.

FIG. 2 is a perspective view illustrating an example of a glass type mobile terminal 400 according to another embodiment of the present invention.

The glass type mobile terminal 400 may be formed to be wearable on a head of a human body (or a head, a face, etc.), and include a frame part (a case, a housing, a cover, etc.) for this. The frame may be formed of a flexible material to facilitate wearing. This drawing illustrates that the frame part includes a first frame 101 and a second frame 102 which are made of different materials. The mobile terminal 400 may generally include the characteristics of the mobile terminal 100 or similar characteristics illustrated in FIGS. 1A to 1C.

The frame is supported on the head and defines a space for mounting various components. As illustrated, electronic components such as a control module 480, an audio output module 452 and the like may be mounted on the frame. In addition, the frame part may be provided with a lens 403 detachably coupled thereto to cover at least one of a left eye and a right eye.

The control module 480 is configured to control various electronic components included in the mobile terminal 400. The control module 180 may be understood as a component corresponding to the controller 180 described above. This drawing illustrates that the control module 280 is installed on the frame at one side of the head. However, the position of the control module 280 is not limited thereto.

The display unit 451 may be implemented as a head mounted display (HMD). The HMD refers to a kid of display which is mounted on a head to display an image directly in front of user's eyes. When the user wears the glass type mobile terminal 400, the display unit 451 may be arranged to correspond to at least one of the left eye and the right eye to provide an image in front of the user's eye. This drawing illustrates that the display unit 451 is located on a portion corresponding to the right eye to output the image toward the user's right eye.

Also, the display unit 451 may project an image to the user's eyes using a prism. Further, the prism may be formed to be transmissive so that the user can view the projected image and a general front view (a range viewed by the user through the eyes) together.

As described above, the image output through the display unit 451 may be viewed in a manner of overlapping the general view. The mobile terminal 400 may provide Augmented Reality (AR), in which a virtual image is superimposed on a real image or a background to be viewed as a single image, by using the characteristics of the display.

A camera 421 is disposed adjacent to at least one of the left eye and the right eye, to capture (take, photograph) an image of a front side. Since the camera 421 is disposed adjacent to the eye, the camera 421 may acquire a scene viewed by the user as an image.

This drawing illustrates that the camera 421 is provided on the controller 480, but the present invention is not limited thereto. The camera 421 may be provided on the frame and provided in plurality to acquire a stereoscopic image.

The glass type mobile terminal 400 may include user input units 423a and 423b manipulated to receive a control command. The user input units 423a and 423b may employ any manner so long as it can be operated by the user in a tactile manner, such as touching or pushing. This drawing illustrates that the frame part and the control module 480 are provided respective with the user input units 423a and 423b which employ touching and pushing manners.

In addition, the glass type mobile terminal 400 may be provided with a microphone (not illustrated) for receiving sound and processing the sound into electric audio data, and an audio output module 452 for outputting sound. The audio output module 452 may be configured to transmit sound in a general sound output manner or a bone-conduction mode. In case where the audio output module 452 is implemented in the bone-conduction manner, when the user wears the glass type mobile terminal 400, the audio output module 452 is brought into close contact with the head and vibrates a skull to transmit sound.

Hereinafter, embodiments related to a control method that can be implemented in a mobile terminal configured as above will be described with reference to the accompanying drawings. It will be apparent to those skilled in the art that the present invention may be embodied in other specific forms without departing from the spirit or essential characteristics thereof.

Figure 3:
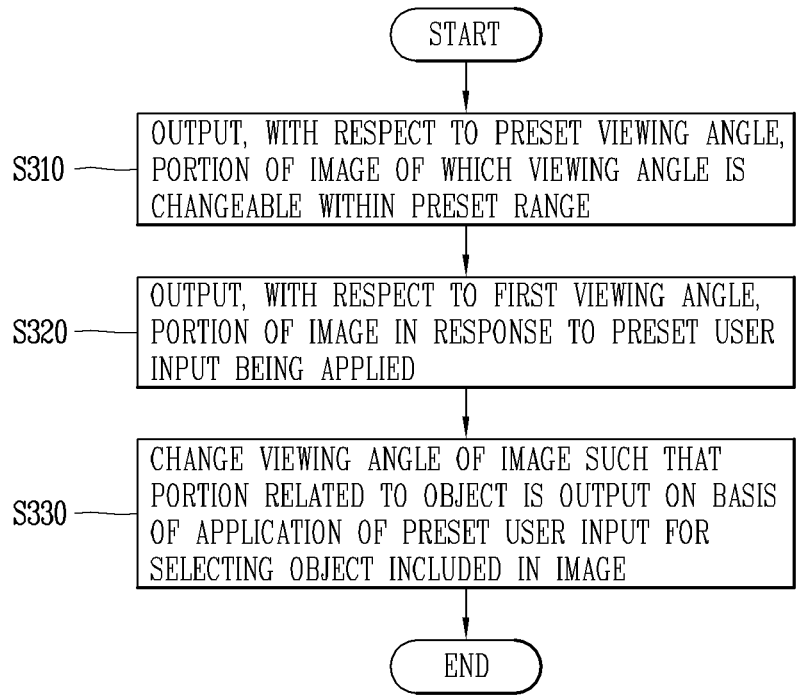
FIG. 3 is a flowchart illustrating a method of controlling a mobile terminal according to the present invention.

FIG. 3 is a flowchart illustrating a method of controlling a mobile terminal according to the present invention.

Referring to FIG. 3, the method includes outputting, with respect to a preset viewing angle, a portion (or a part) of an image of which a viewing angle is changeable within a preset range (S310).

The image refers to an image in which a viewpoint, namely, a viewing angle (direction) is freely changeable during reproduction. Specifically, unlike an existing image in which a viewpoint is fixed, the user may arbitrarily select a desired viewpoint in the image using an input device such as a keyboard, a mouse, and an accelerometer. In addition, the viewpoint of the image may be changed freely in the range from 0 to 360°.

To this end, images are captured using a camera which can omnidirectionally capture 360° view, and merged using a specific metadata SW. Then, when the merged data is uploaded to a server of a service provider or the like, the server may output an image which the user can view while freely changing the viewing angle (direction).

Subsequently, a first portion of the image, with respect to a first viewing angle, is output in response to a preset user input being applied.

As an embodiment, an icon for changing a viewpoint (or a viewing angle) may be output, and a viewing angle of an image may be changed in response to a touch input being applied to the icon.

Thereafter, in response to a preset user input being applied to select an object included in the image, the viewing angle of the image is changed such that a portion associated with the object is output (S330).

Specifically, the object included in the image may be set variously to a person, an object, a thing, an animal, and the like. In addition, the portion of the image associated with the selected object may include a portion including the selected object, a portion which tracks the selected object so that the selected object is continuously output, a portion corresponding to a gaze of the selected object, a portion which tracks an object viewed by the selected object, and the like.

As an embodiment, when a moving person is selected in the image, a portion of an image which is captured while tracking the movement of the person may be output. For this purpose, a viewing angle of the image may be automatically changed.

That is, a mode of the terminal may be switched from a 'manual mode' in which a viewing angle of an image is changed according to a user input into an 'automatic mode' in which the viewing angle of the image is automatically changed according to a selected object. In an embodiment, a portion of an image of which a viewing angle is changed according to a movement (motion) of a person may be output.

In another embodiment, a portion of an image of which viewing angle is changed according to a user input may be output to one of a plurality of regions, and a portion of an image of which viewing angle is automatically changed according to a selected object may be output to another region. That is, the 'manual mode' and the 'automatic mode' can be executed simultaneously in the respective regions.

Hereinafter, detailed embodiments will be described.

On the other hand, the controller 180 may change the viewing angle of the image in response to a preset touch input being applied to an icon for changing the viewing angle of the image.

Figure 4:
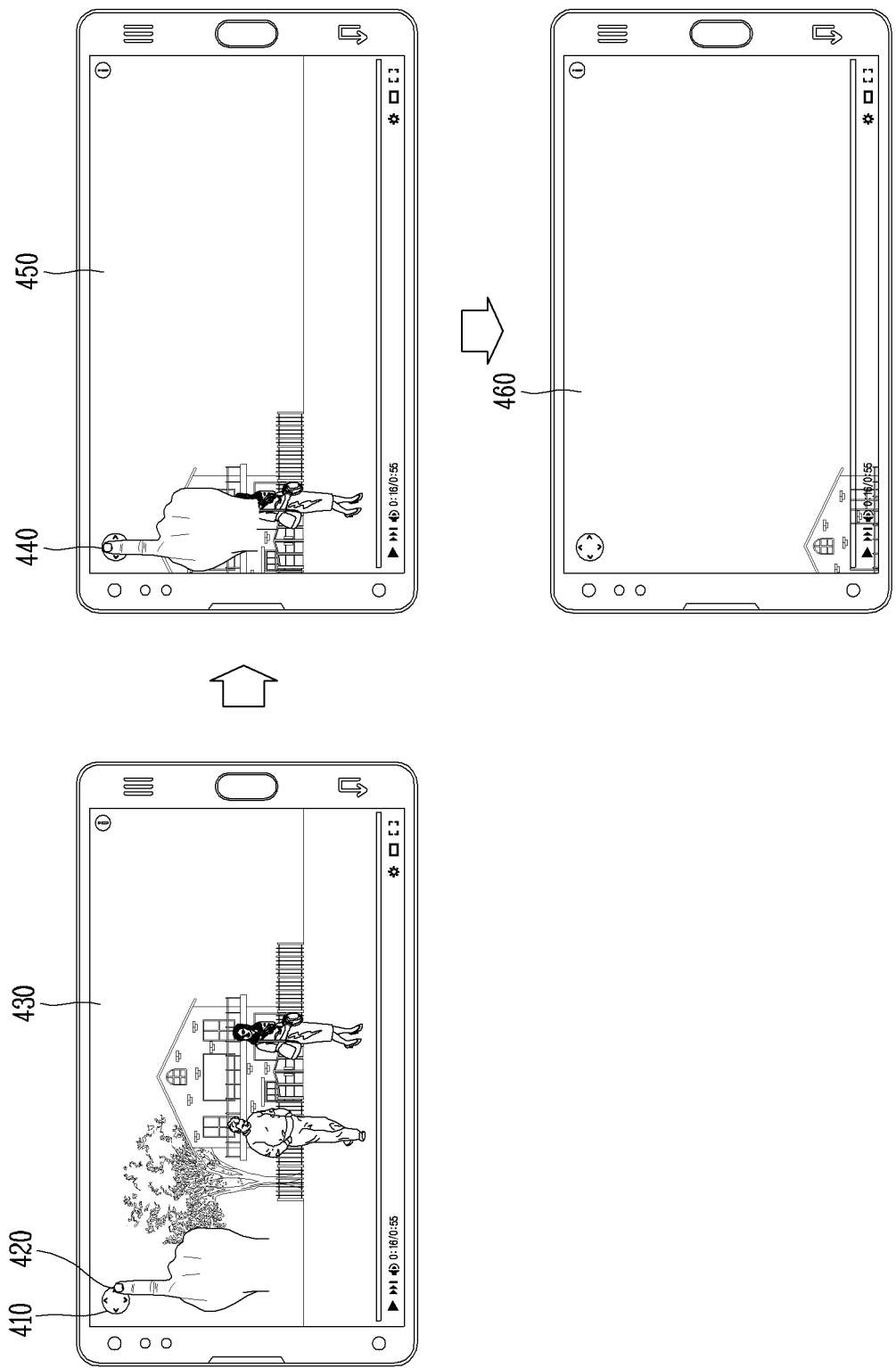
FIG. 4 is a conceptual view illustrating an embodiment of outputting an icon for setting a viewing angle.

FIG. 4 is a conceptual view illustrating an embodiment of outputting an icon for setting a viewing angle.

Referring to FIG. 4, a portion 430, with respect to a preset viewing angle, of an image whose viewing angle is changeable and a direction selection icon 410 for changing the viewing angle of the image may be output.

As an embodiment, when a touch input 420 is applied to a right direction of the direction selection icon 410, a portion 450 in which the viewing angle of the image has been shifted to the right by a preset degree may be output.

Then, when a touch input 440 is applied to an upward direction of the direction selection icon 410, a portion 460 in which the viewing angle of the image has been shifted upward by a preset degree may be output.

In a similar embodiment, when a touch input is applied to a left or downward direction of the direction selection icon 410, a portion in which the viewing angle of the image has been shifted to the left or downward by a preset degree may be output.

As another embodiment, the viewing angle of the image may be shifted while a touch input is applied to the direction selection icon 410. Specifically, while a touch input is applied to the right direction of the direction selection icon 410, the viewing angle of the image may be shifted to the right at a preset speed. Thereafter, when a finger applying the touch input is released, the viewing angle of the image is maintained.

On the other hand, the controller 180 may automatically change the viewing angle of the image to output a portion A of the image in which a first object is included, in response to a preset user input for selecting the first object being applied (Object tracking).

Also, the controller 180 may terminate the output of the portion A, in response to the first object being output in a preset size or less while the portion A is output.

Figure 5:
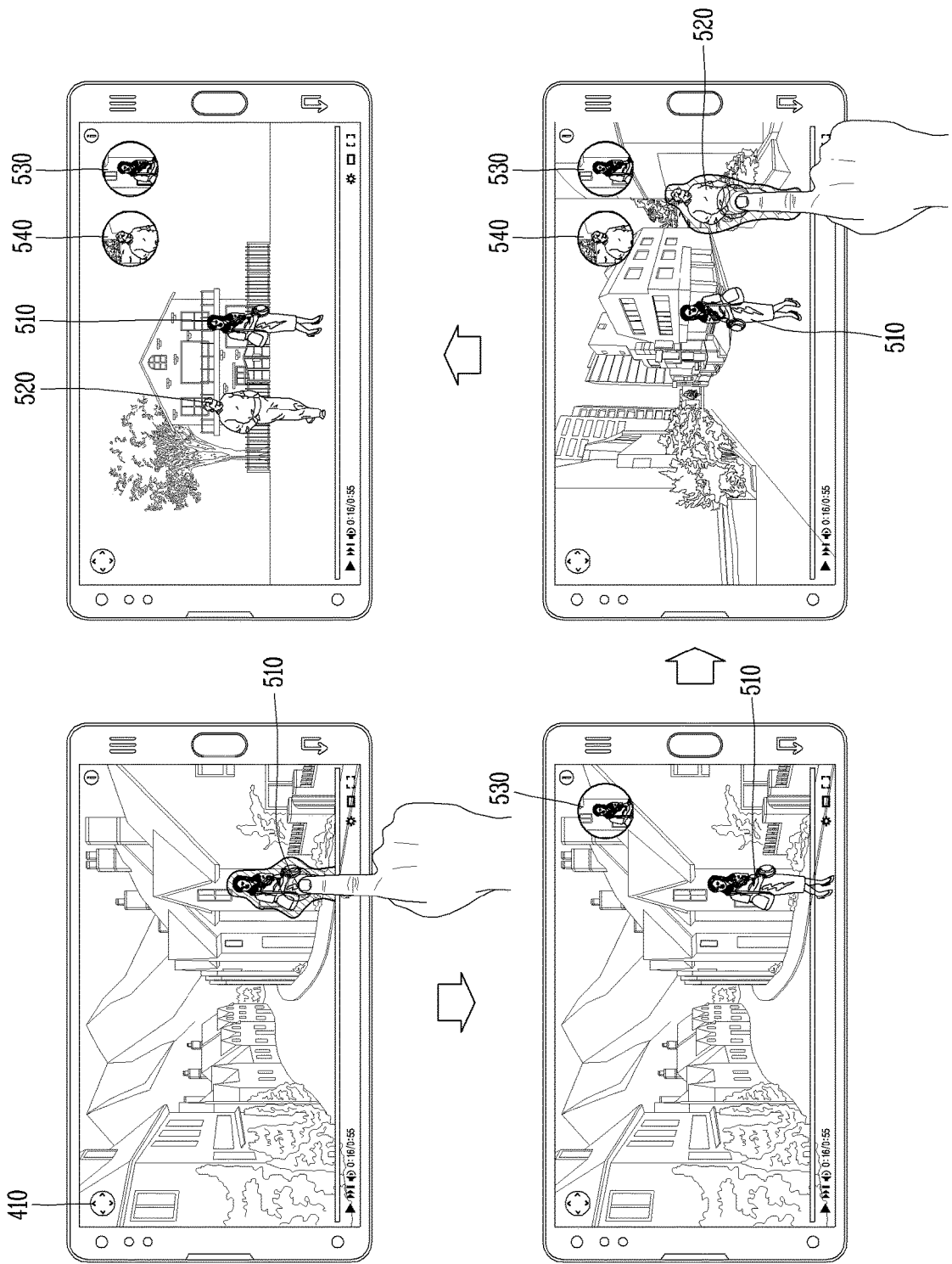
FIG. 5 is a conceptual view illustrating an embodiment in which a part of an image tracking a specific person is output.

FIG. 5 is a conceptual view illustrating an embodiment in which a portion of an image tracking a specific person is output.

Referring to FIG. 5, when a long touch input is applied to a first person 510 within the image, the first person 510 may be selected. Accordingly, an outline of the first person 510, which indicates that the first person 510 has been selected, may be output while the long touch input is applied.

In addition, a first icon 530 corresponding to the first person 510 and a portion A of the image in which the first person 510 is included may be output. The portion A refers to a portion where the first person 510 is continuously output. For this purpose, the viewing angle of the image may be automatically changed without a user input. That is, the portion A may include a plurality of portions in which the viewing angle of the image is changed.

As an example, a first portion of the image with respect to a first viewing angle may be output. At this time, the first portion may be currently output with the first person 510 included therein. Thereafter, when a first object is not output in the first portion any more due to a movement of the first person 510, the first viewing angle may be changed to a second viewing angle such that the first person 510 is continuously (consecutively) output. As a result, a second portion of the image with respect to the second viewing angle may be output. At this time, the second portion is being output with the first object included therein. That is, the portion A includes the first portion and the second portion.

At this time, the viewing angle of the image may be changed so that the first person 510 is displayed on a center of the screen 151. Also, the first person 510 may be automatically enlarged or reduced so that the whole body is output.

The portion A may be output until the first person 510 is output in a preset size or less or is no longer present in the image or may be output for a preset time. At the end of the output of the portion A, the portion A may be switched back to a portion of the image which was being output initially, and a notification message informing it may be output. Alternatively, the reproduction of the image may be terminated.

Then, when a long touch input is applied to a second person 520 included in the portion A, the second person 520 may be selected. Accordingly, an outline of the second person 520 which indicates that the second person 520 has been selected may be output while the long touch input is applied.

A second icon 540 corresponding to the second person 520 and a portion AB including the first person 510 and the second person 520 in the image may be output. In an embodiment, when the first person 510 and the second person 520 are moving, a partial image in which the viewing angle of the image changes along with the movement of the first person 510 and the second person 520 may be output.

The portion AB indicates a portion where the first person 510 and the second person 520 are continuously output. For this purpose, the viewing angle of the image may be automatically changed without a user input. That is, the portion AB may include a plurality of portions in which the viewing angle of the image is changed.

At this time, the viewing angle of the image may be changed so that the first person 510 and the second person 520 are output on a center of the screen 151. Also, the first person 510 and the second person 520 may be automatically enlarged or reduced such that the entire bodies of them can be output.

The portion AB may be output until the first person 510 and the second person 520 are output in a preset size or less or are no longer present in the image or may be output for a preset time. At the end of the output of the portion AB, the portion AB may be switched back to a portion of the image which was being initially output, and a notification message informing it may be output. Alternatively, the reproduction of the image may be terminated.

In another embodiment, when a distance between the first person 510 and the second person 520 is too great to be output in one portion, only a portion of the image which includes the first person 510 or the second person 520 may be output. In this manner, an output priority of an image portion may be set according to a selection of a person, a reproduction time, a specific person, and the like.

In another embodiment, when a distance between the first person 510 and the second person 520 is too great to output in one portion, a portion of the image which tracks the first person 510 and a portion of the image which tracks the second person 520 may be output in split screens, respectively.

On the other hand, the controller 180 may automatically change the viewing angle of the image such that a portion B of the image which includes a second object is output, in response to a preset user input being applied to select the second object, which is included in the image and different from the first object.

Figure 6:
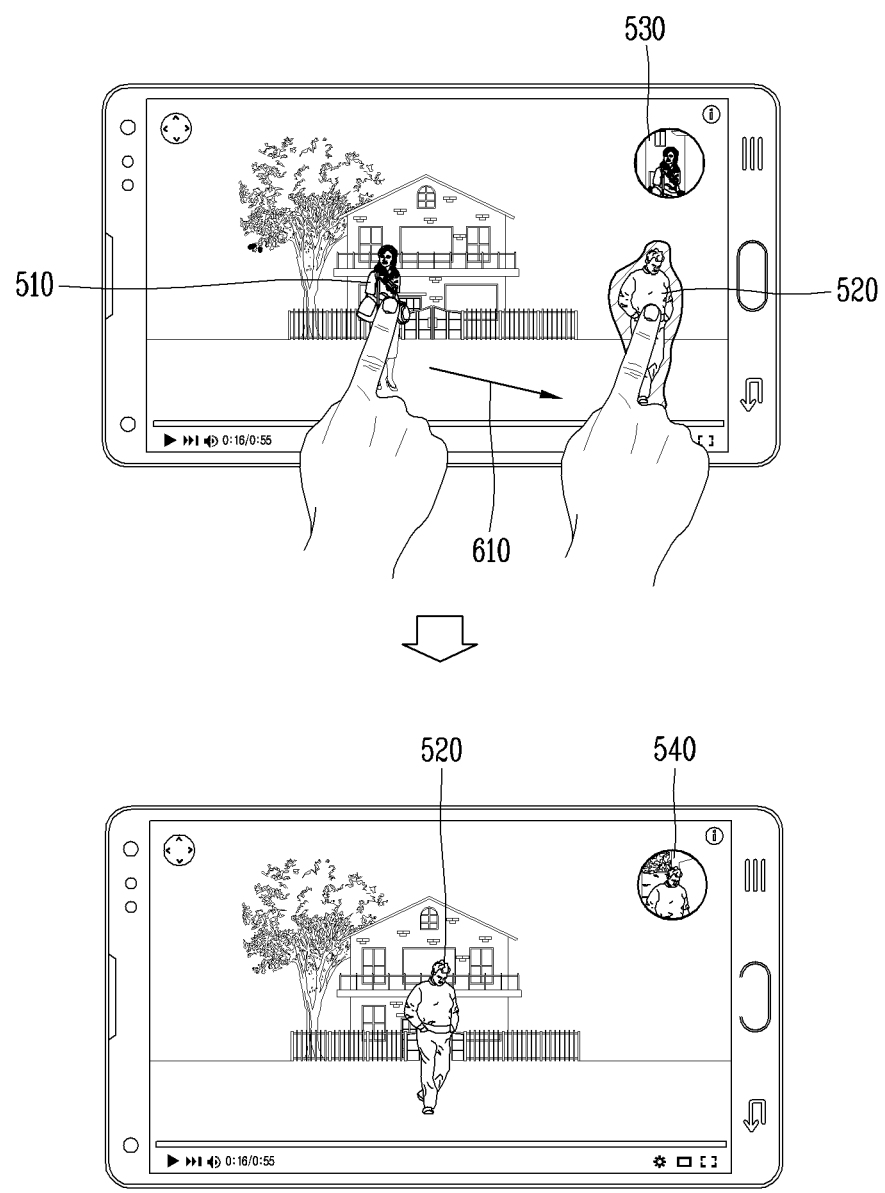
FIG. 6 is a conceptual view illustrating an embodiment in which a specific person is changed.

FIG. 6 is a conceptual view illustrating an embodiment in which a specific person is changed.

Referring to FIG. 6, while the portion A of the image tracking the first person 510 and the first icon 530 are being output as illustrated in FIG. 5, a drag input 610 may be applied from the first person 510 to the second person 520.

Accordingly, an outline of the second person 520 which indicates that the second person 520 has been selected may be output. In addition, a second icon 540 corresponding to the second person 520 and a portion B of the image which tracks the second person 520 may be output.

That is, a person which is selected by a preset touch input may be switched.

Meanwhile, the controller 180 may display a reproduction time corresponding to the portion A on a reproduction bar of the image.

Figure 7:
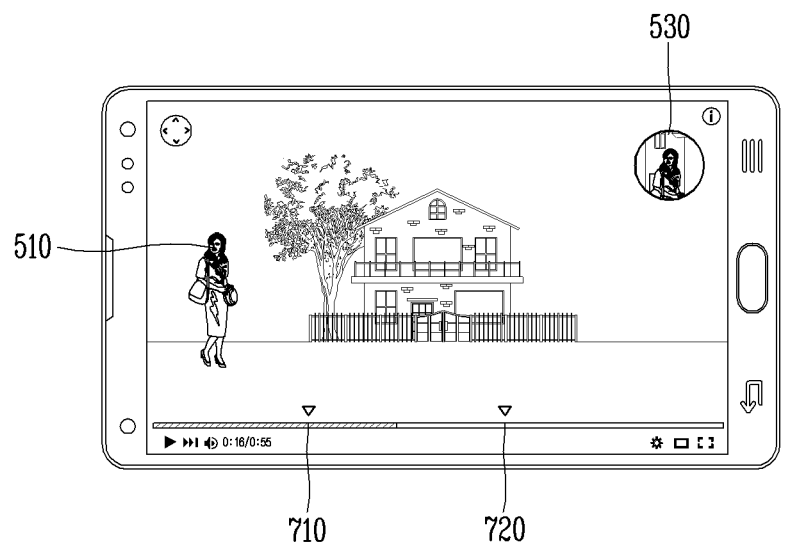
FIG. 7 is a conceptual view illustrating an embodiment in which a reproduction time of a portion of an image tracking a specific person is displayed.

FIG. 7 is a conceptual view illustrating an embodiment in which a reproduction time of a portion of an image tracking a specific person is displayed.

Referring to FIG. 7, a start time point 710 and an end time point 720 of the portion A may be displayed on the reproduction bar of the image at the time of outputting the portion A. That is, a portion of the image in which the first person 510 is consecutively included (output) may be displayed.

On the other hand, the controller 180 may split the display unit 151 in a preset manner, in response to a preset user input for selecting the first object being applied, and output the first portion and the portion A in the respective split regions.

As an embodiment, the controller 180 may output a portion of the image with respect to a changing viewing angle in the region where the first portion is currently output, in response to a preset user input for changing the viewing angle being applied.

Figure 8:
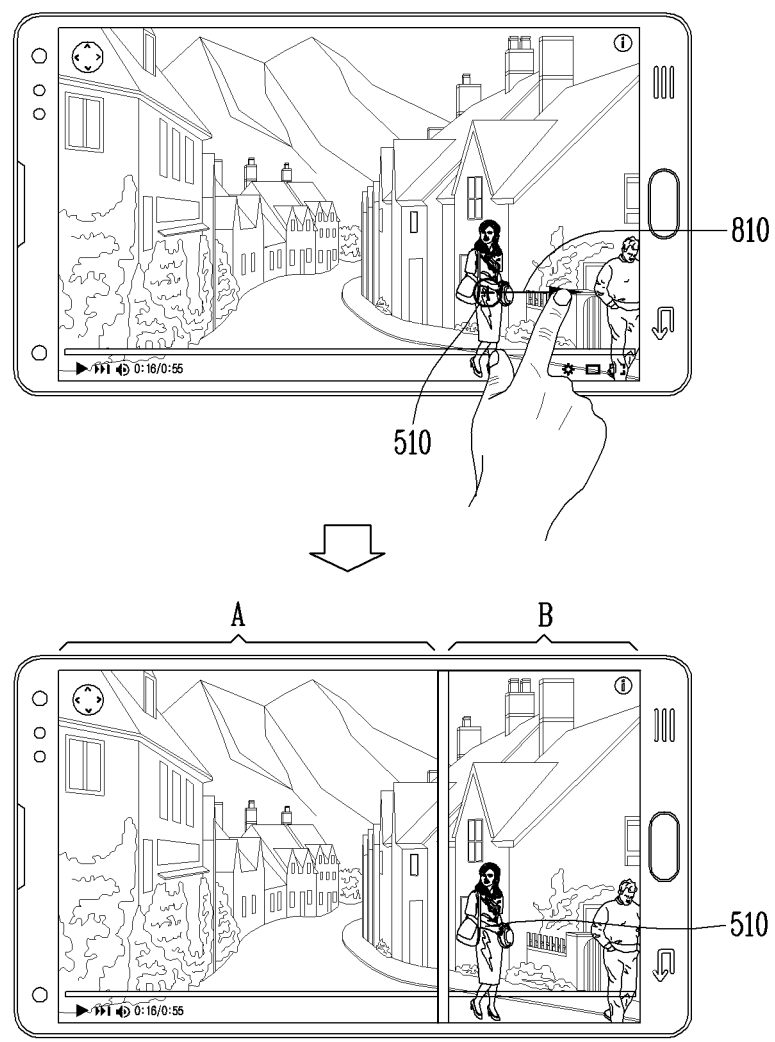
FIGS. 8 and 9 are conceptual views illustrating an embodiment in which a portion of an image with respect to a set viewing angle and a portion of an image tracking a specific person are output in split screens, respectively.
Figure 9:
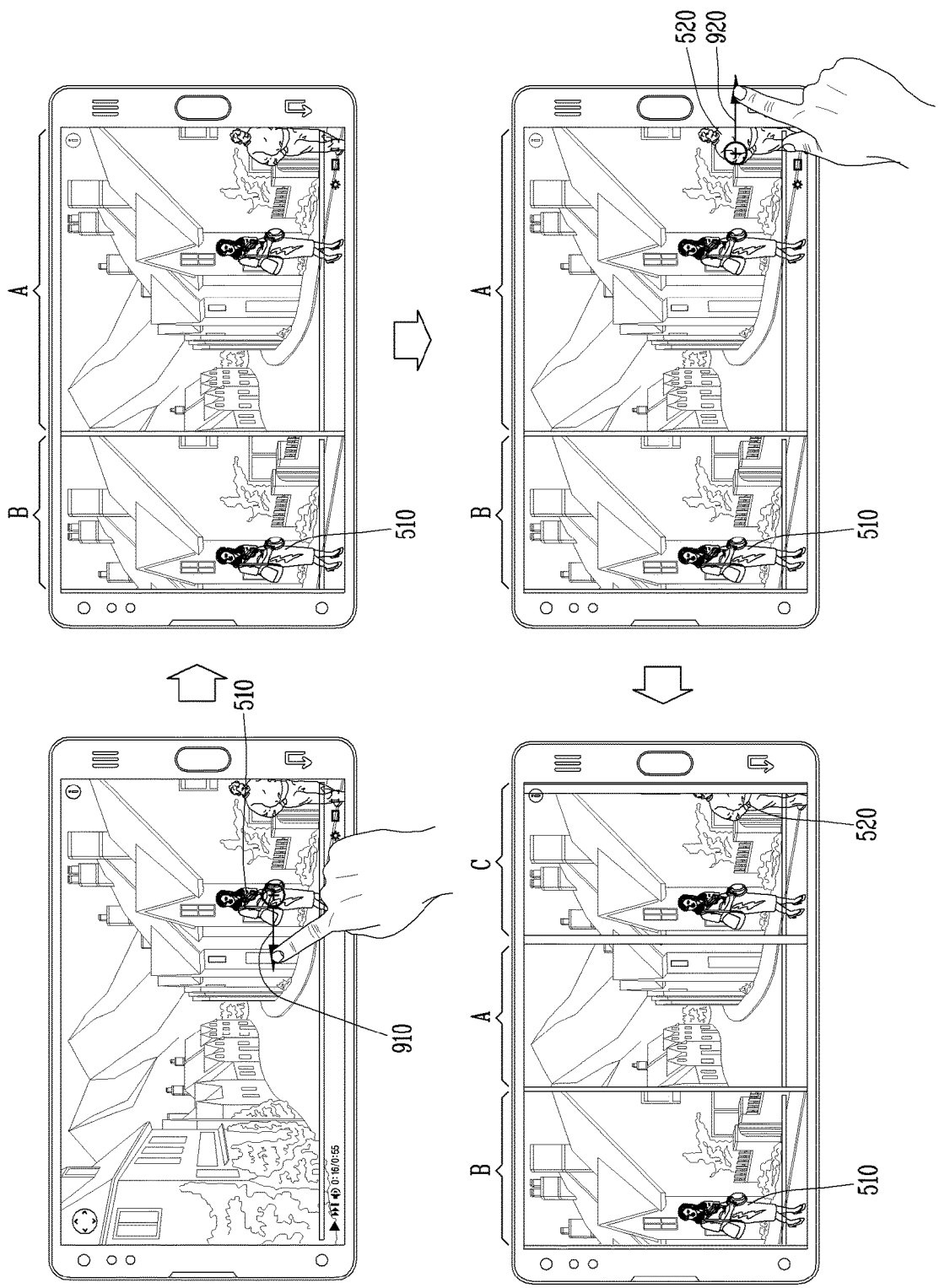

FIGS. 8 and 9 are conceptual views illustrating an embodiment in which a portion of an image with respect to a set viewing angle and a portion of an image tracking a specific person are output in split screens, respectively.

Referring to FIG. 8, when a drag input 810 to the right is applied to the first person 510 in the image, the screen 151 may be split into a first region A on the left side and a second region B on the right side.

In an embodiment, a portion with respect to a viewing angle set by a viewing angle icon, as illustrated in FIG. 4, may be output in the first region A on the left side and the portion A of the image tracking the first person 510 may be output in the second region B on the right side.

That is, the portion of the image in which the viewing angle of the image is changed by a user input is output in the first region A on the left side, and the portion A of the image in which viewing angle of the image is automatically changed is output in the second region B on the right side.

As another embodiment, referring to FIG. 9, when a drag input 910 to the left is applied to the first person 510 in the image, the screen 151 may be split into a second region B on the left side and a first region A on the right side.

As an embodiment, the portion with respect to the viewing angle set by the viewing angle icon, as illustrated in FIG. 4, may be output in the first region A on the right side and the portion A of the image tracking the first person 510 may be output in the second region B on the left side.

In other words, the portion A of the image in which the viewing angle of the image is automatically changed may be output in the second region B on the left side, and the portion of the image in which the viewing angle of the image is changed by the user input may be output in the first region A on the right side.

Compared with the embodiment of FIG. 8, the output position of the portion A of the image, in which the viewing angle of the image is automatically changed, may be changed according to a direction of a drag input.

As another embodiment, a drag input 920 to the right may be applied to the second person 520 in the image. Accordingly, the screen 151 may be split into a second region B on the left side, a first region A on the middle, and a third region C on the right side.

As an embodiment, the portion with respect to the viewing angle set by the viewing angle icon may be output in the first region A on the middle, the portion A of the image tracking the first person 510 may be output in the second region B on the left side, and the portion B of the image tracking the second person 520 may be output in the third region C on the right side.

That is, the portion A and the portion B of the image in each of which the viewing angle of the image is automatically changed may be output in the regions B and C on the left and right sides, respectively, and the portion of the image in which the viewing angle of the image is changed by the user input may be output in the middle first region A.

On the other hand, the controller 180 may output the portion A of the image on an upper layer of the first portion, which is currently output on the entire region of the display unit, in response to a preset user input for selecting the first object being applied.

As an embodiment, the controller 180 may output a portion of the image with respect to a changing viewing angle in the region where the first portion is currently output, in response to a preset user input for changing the viewing angle being applied.

In another embodiment, the controller 180 may change an output position of the upper layer or a size of the upper layer, in response to a preset touch input being applied to the upper layer.

Figure 10:
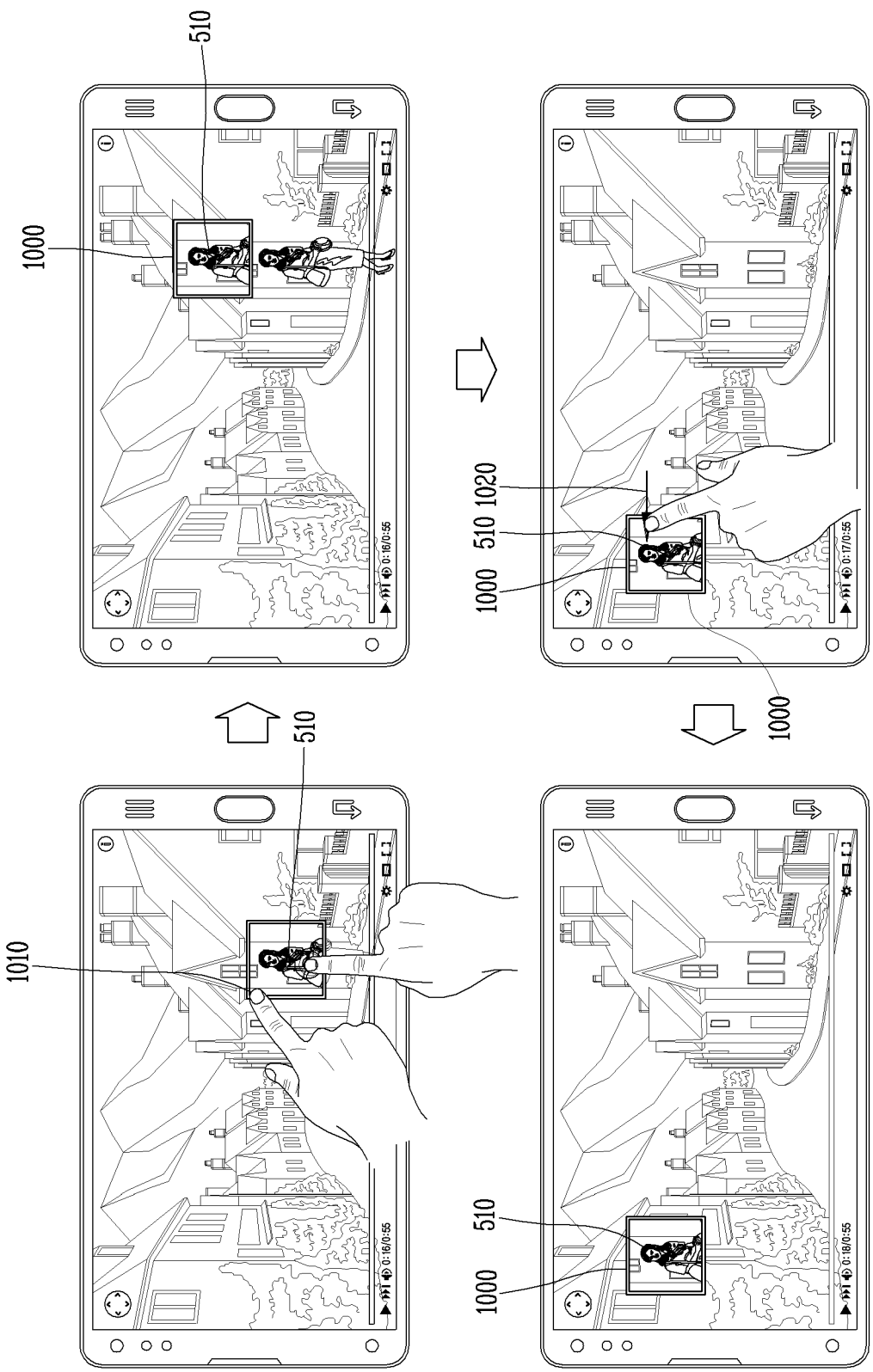
FIG. 10 is a conceptual view illustrating an embodiment in which a portion of an image tracking a specific portion is output on an upper layer.

FIG. 10 is a conceptual view illustrating an embodiment in which a portion of an image tracking a specific portion is output on an upper layer.

Referring to FIG. 10, after a long touch input is applied to the first person 510 in the image, a touch input 1010 for drawing a rectangular region including the first person 510 may be applied.

Accordingly, the rectangular region may be output in one region of an edge of the screen 151 as an upper layer 1000.

As an embodiment, a shape, a size, a position, etc. of the region including the first person 510 may be variously set according to a user touch input. Specifically, in response to a touch input for drawing a circular region including the first person 510, the circular region may be output in one region of a lower end of the screen 151 as an upper layer. In addition, a size of the circular region including the first person 510 may be set smaller or larger according to a user touch input.

Then, when a left drag input 1020 is applied to the upper layer 1000, the upper layer 1000 may be moved to the left. As an embodiment, the upper layer 1000 may be moved to various positions according to a direction in which a drag input is applied to the upper layer 1000.

Figure 11:
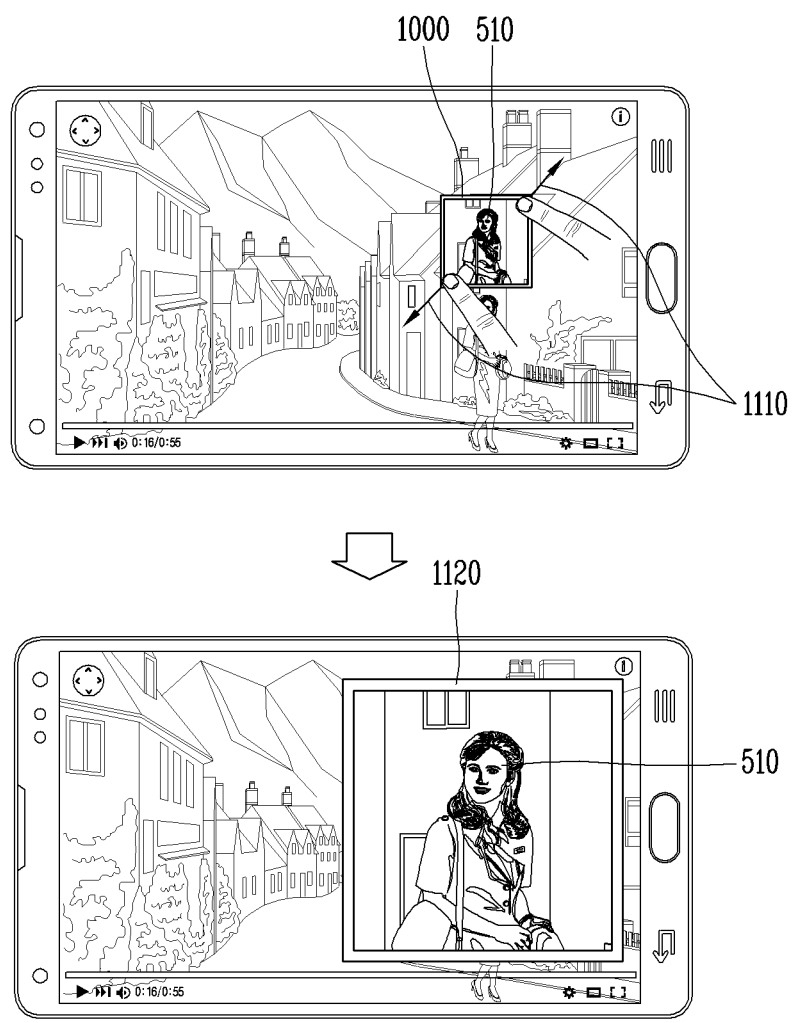
FIGS. 11 and 12 are conceptual views illustrating an embodiment of adjusting a size of an upper layer on which a portion of an image tracking a specific person is output.
Figure 12:
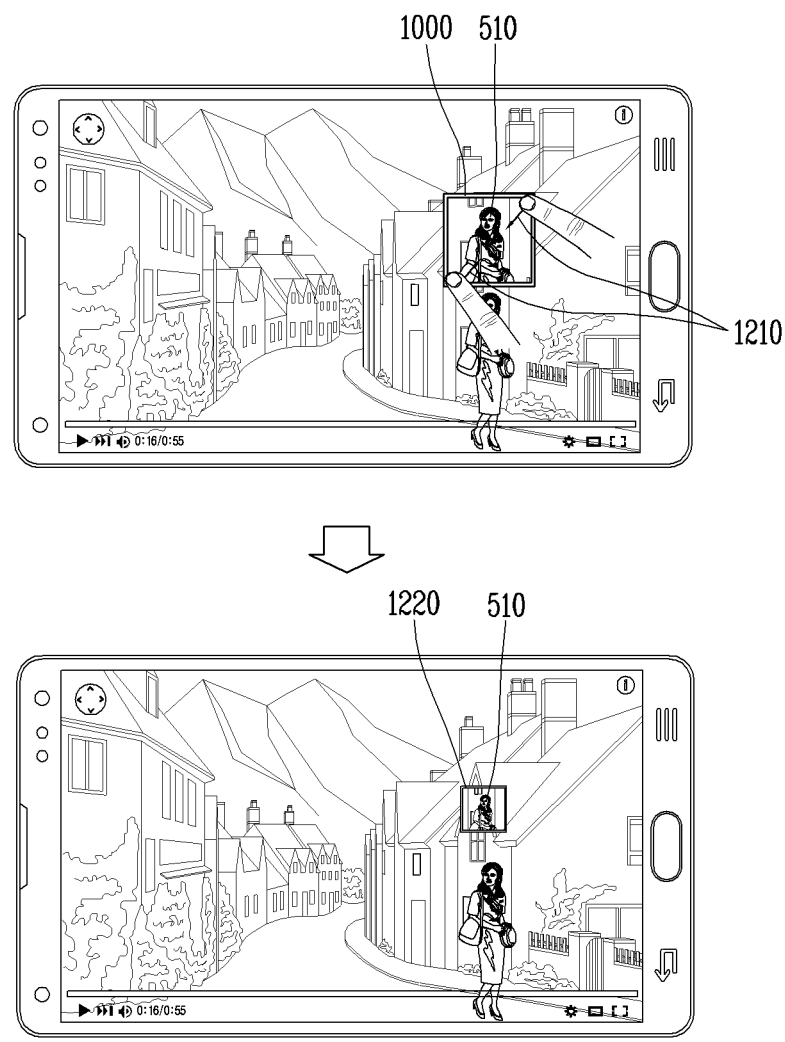

FIGS. 11 and 12 are conceptual views illustrating an embodiment of adjusting a size of an upper layer on which a portion of an image tracking a specific person is output.

Referring to FIG. 11, when a pinch-out input 1110 is applied to an edge of the upper layer 1000 illustrated in FIG. 10, an upper layer 1120 which increases in size according to an applied degree of the pinch-out input 1110 may be output.

As an embodiment, as the pinch-out input is applied longer, the size of the upper layer 1000 may further increase. Also, as the size of the upper layer increases, a person which is currently output on the upper layer may also be enlarged.

As another embodiment, referring to FIG. 12, when a pinch-in input 1210 is applied to an edge of the upper layer 1000 illustrated in FIG. 10, an upper layer 1220 which is reduced in size according to an applied degree of the pinch-in input 1210 may be output.

As an embodiment, as the pinch-in input is applied longer, the size of the upper layer 1000 may be further reduced. Also, as the size of the upper layer is reduced, a person which is currently output on the upper layer may also be reduced.

On the other hand, the controller 180 may zoom in or zoom out the portion A, in response to a preset touch input being applied to the upper layer.

Figure 13:
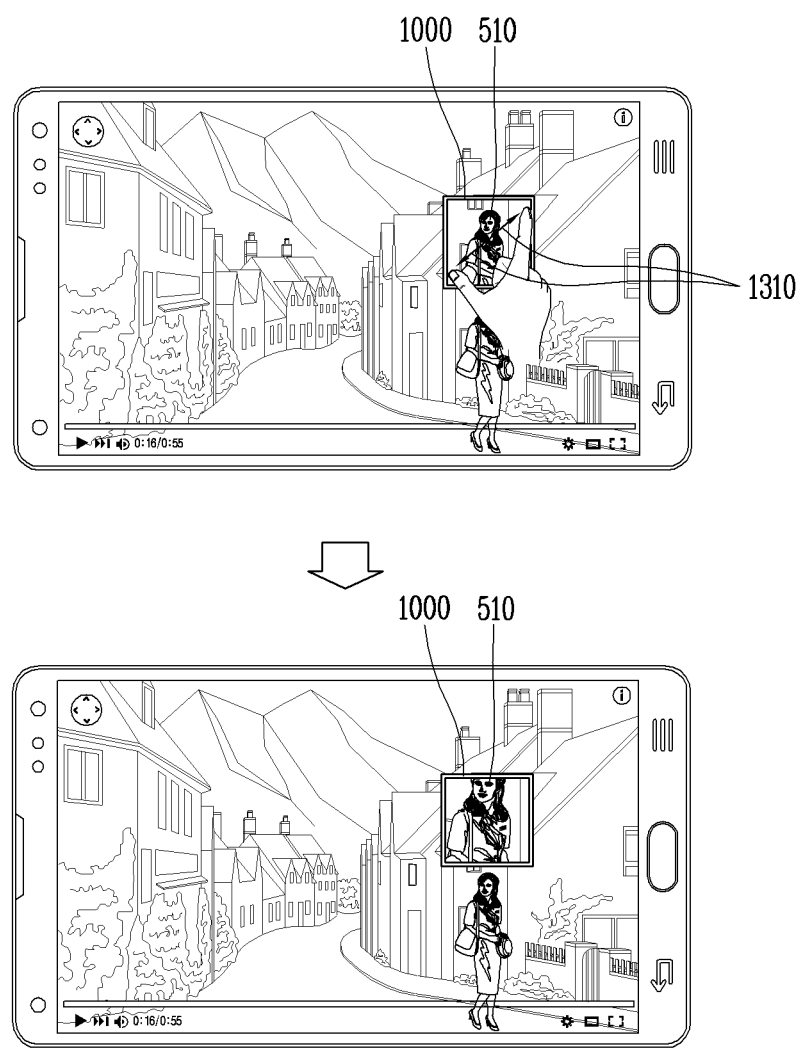
FIGS. 13 and 14 are conceptual views illustrating an embodiment in which a portion of an image tracking a specific person, which is output on an upper layer, is zoomed in or out.
Figure 14:
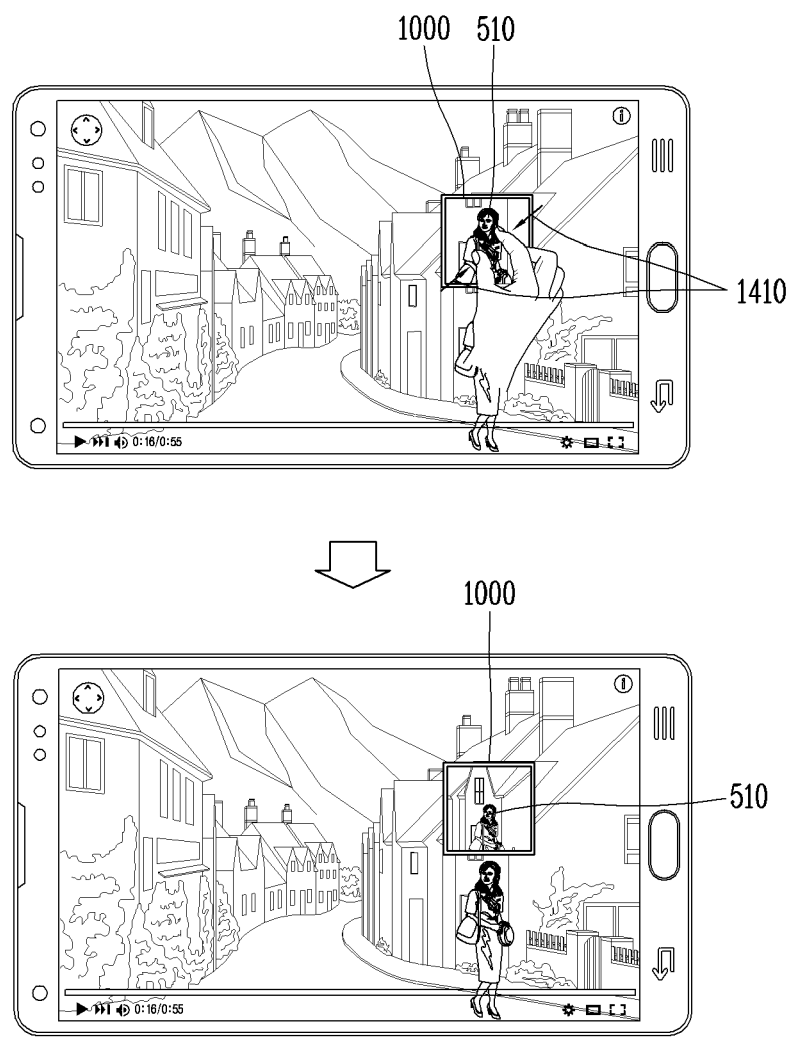

FIGS. 13 and 14 are conceptual views illustrating an embodiment in which a portion of an image tracking a specific person, which is output on an upper layer, is zoomed in or out.

Referring to FIG. 13, when a pinch-out input 1310 is applied to a region within the upper layer 1000 illustrated in FIG. 10, a portion of the image in which the first person is zoomed in according to an applied degree of the pinch-out input 1310 may be output on the upper layer 1000.

As an embodiment, as the pinch-out input is applied longer, the first person 510 in the upper layer 1000 may be viewed larger. At this time, the size of the upper layer 1000 may be kept constant.

As another embodiment, referring to FIG. 14, when a pinch-in input 1410 is applied to a region within the upper layer 1000 illustrated in FIG. 10, a portion of the image in which the first person 410 is zoomed out according to an applied degree of the pinch-in input 1410 may be output on the upper layer 1000.

As an embodiment, as the pinch-in input is applied longer, the first person 510 in the upper layer 1000 may be viewed smaller. At this time, the size of the upper layer 1000 may be kept constant.

As another embodiment, the portion of the image within the upper layer may be set to be zoomed in when a pinch-out input is applied and zoomed out when a pinch-in input is applied.

On the other hand, when a preset touch input is applied to the upper layer, the controller 180 may output a portion of the image tracking a specific person on the entire region of the display unit 151 and output a portion of the image with respect to a set viewing angle on the upper layer.

That is, the image portions currently output on the entire screen and the upper layer can be switched with each other in position.

Figure 15:
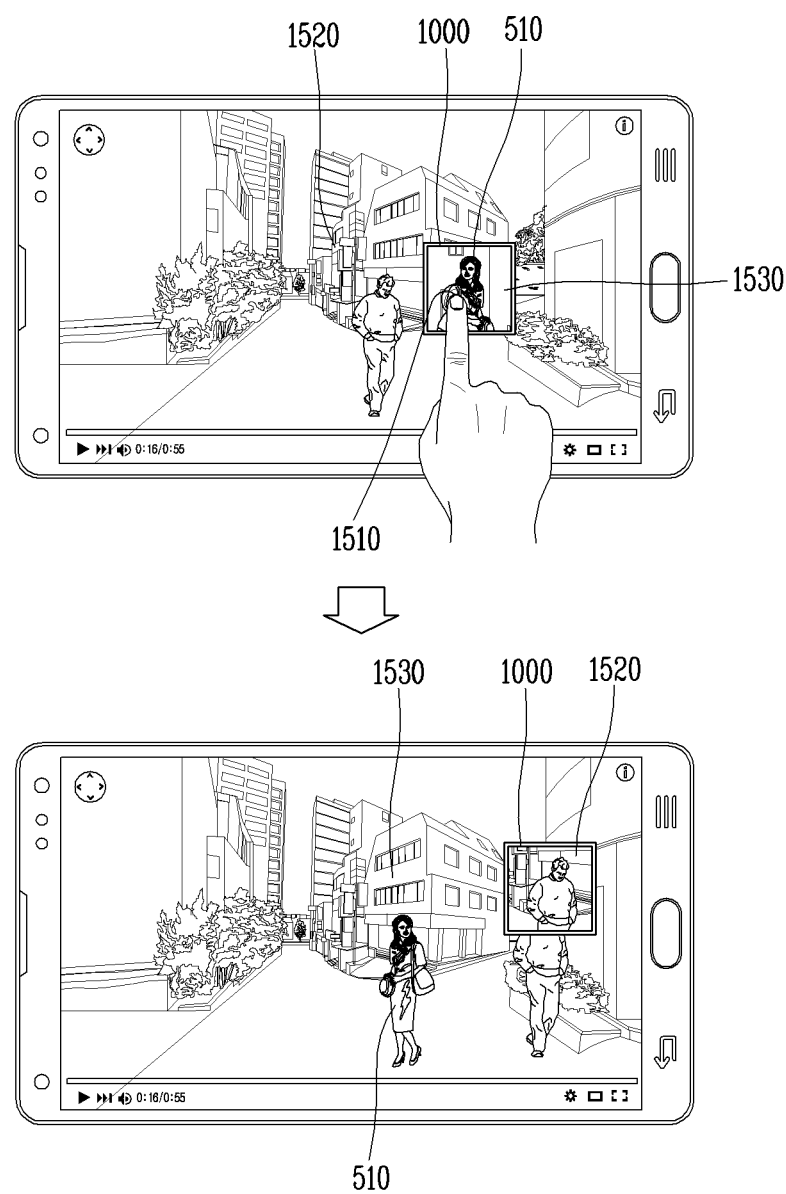
FIG. 15 is a conceptual view illustrating an embodiment in which a portion of an image with respect to a set viewing angle output on a full screen and a portion of an image tracking a specific person output on an upper layer are switched in position.

FIG. 15 is a conceptual view illustrating an embodiment in which a portion of an image with respect to a set viewing angle output on a full screen and a portion of an image tracking a specific person output on an upper layer are switched in position.

Referring to FIG. 15, when a touch input 1510 is applied to the upper layer 1000, a portion 1520 of the image with respect to a set viewing angle being output on the entire screen and a portion of the image tracking the specific person currently output on the upper layer 1000 may be switched with each other in position.

That is, the portion of the image that tracks the specific person may be output on the entire screen 151 and the portion 1520 of the image with respect to the set viewing angle may be output on the upper layer 1000.

As another embodiment, when a touch input is applied to a lower layer (the entire screen) of the upper layer 1000, positions of the entire screen and an image portion being output on the upper layer may be switched with each other.

On the other hand, as an embodiment related to FIGS. 10 to 15, the user may adjust the viewing angle of the image by applying a touch input to the viewing angle icon as illustrated in FIG. 4. Accordingly, a portion of the image corresponding to the changed viewing angle may be output on the entire screen. On the other hand, a portion of the image in which the viewing angle of the image is automatically changed so that a specific person is continuously output may be output on the upper layer.

On the other hand, the controller 180 may output a plurality of icons corresponding to a plurality of objects included in the image, respectively. When a preset touch input is applied to at least one of the plurality of icons, the controller 180 may output a portion of the image in which an object corresponding to the at least one icon is included.

Figure 16:
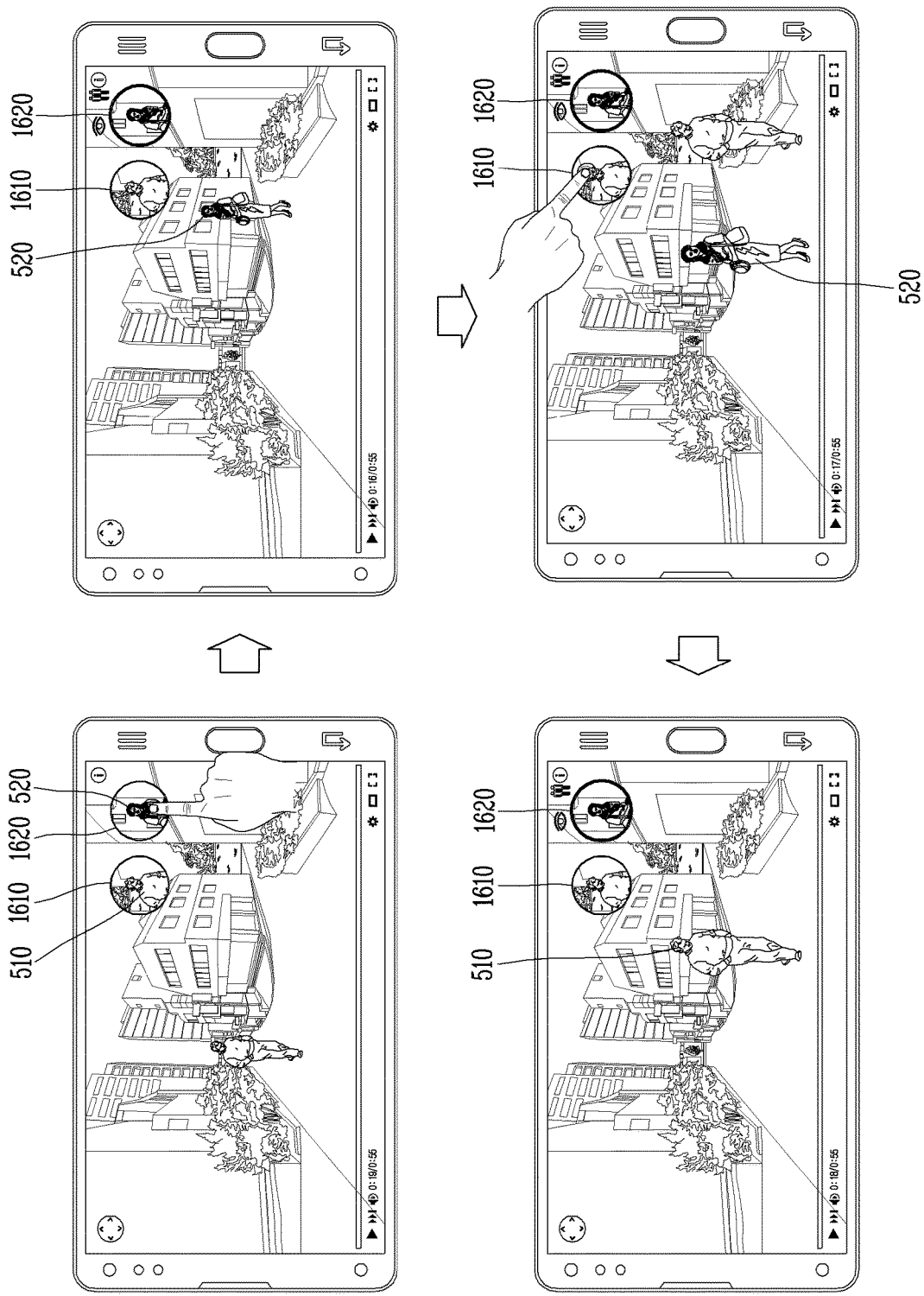
FIG. 16 is a conceptual view illustrating an embodiment in which a portion of an image tracking a person is output by applying a touch input to an icon corresponding to the person.

FIG. 16 is a conceptual view illustrating an embodiment in which a portion of an image tracking a person is output by applying a touch input to an icon corresponding to the person.

Referring to FIG. 16, a plurality of icons 1610 and 1620 corresponding to a plurality of persons 510 and 520 included in the image may be output.

As an embodiment, a plurality of persons may be all persons recognized as being included in the image or may be persons previously selected by the user. Alternatively, the plurality of persons may be persons who appears in the image for a preset time or persons output in a preset size.

As another embodiment, when a touch input is applied to a second icon 1620 corresponding to the second person 520, the portion B of the image tracking the second person 520 may be output on the screen 151. That is, the portion B of the image in which the viewing angle of the image is automatically changed along with the movement of the second person 520 may be output on the screen 151. Meanwhile, an image of the second person 520 may be output on the second icon 1620.

Then, when a touch input is applied to the first icon 1610 corresponding to the first person 510, the portion A of the image tracking the first person 510 may be output on the screen 151. That is, the output of the portion B is terminated, and the portion A of the image in which the viewing angle of the image is automatically changed along with the movement of the first person 510 may be output. On the other hand, an image of the first icon 1610 may be output on the first icon 1610.

As described above, the portion A may be output for a preset time or until the first person 510 disappears from the image. Thereafter, a portion of the image that was being output before the person was selected may be output again.

As another embodiment, a touch input may be applied again to the first icon 1610 while the portion A is output. As a result, the portion of the image that was being output before the person was selected may be output again on the screen 151.

On the other hand, the user may release a selected object in a step of selecting an object in the image.

Figure 17:
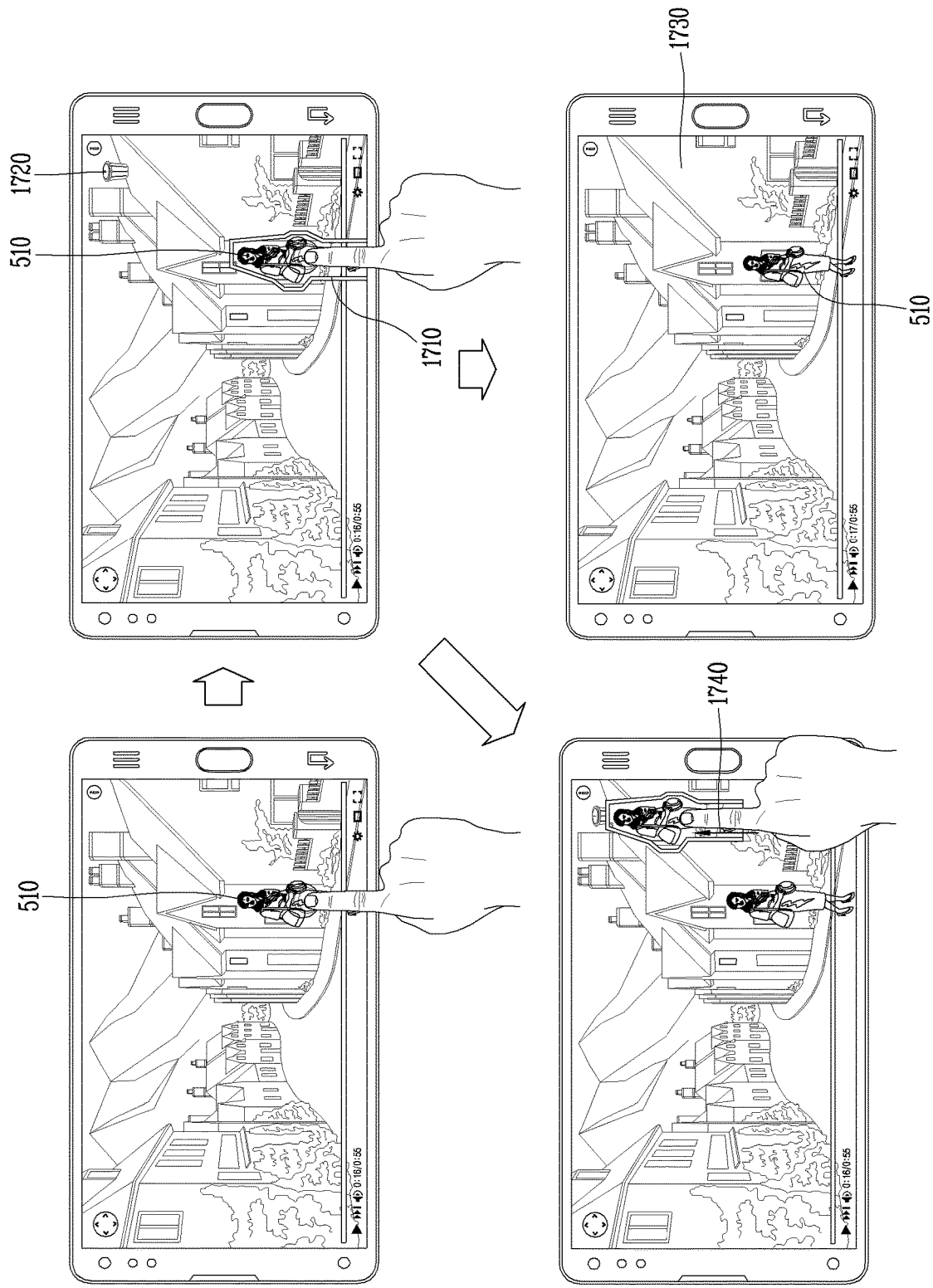
FIG. 17 is a conceptual view illustrating an embodiment in which a person is selected or the selected person is released.

FIG. 17 is a conceptual view illustrating an embodiment in which a person is selected or the selected person is released.

Referring to FIG. 17, when a long touch input is applied to the first person 510 in the image, the first person 510 may be selected. Accordingly, an outline 1710 surrounding the first person 510 and a trash can icon 1720 may be output.

As an embodiment, the selection with respect to the first person 510 may be released when a drag input 1740 toward the trash can icon 1720 is applied while the long touch input is applied to the first person 510.

As another embodiment, when a finger that has applied the long touch input to the first person 510 is released, a portion A 1730 of the image tracking the first person 510 may be output. At this time, the portion A 1730 may be output for a preset time or until the first person 510 disappears from the image or is reduced down to a preset size or less.

On the other hand, when a preset user input is applied, the controller 180 may calculate a region associated with the first object based on at least one of a gaze direction, a head direction, a body direction, and a pointing direction of the first object, and change the viewing angle of the image such that a portion of the image including the calculated region is output.

Figure 18:
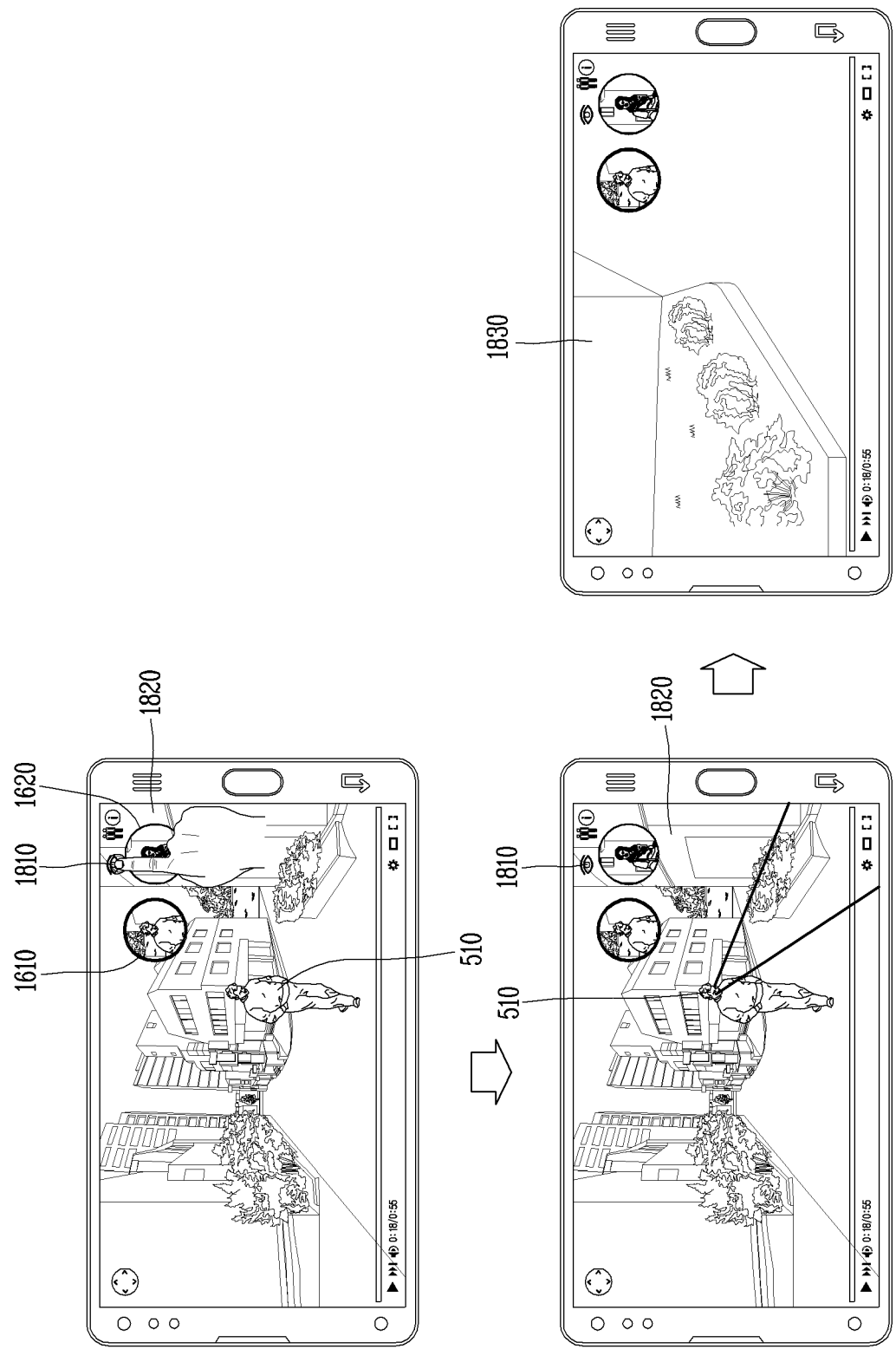
FIGS. 18 to 20 are conceptual views illustrating an embodiment in which a portion of an image corresponding to a gaze of a person is output.
Figure 19:
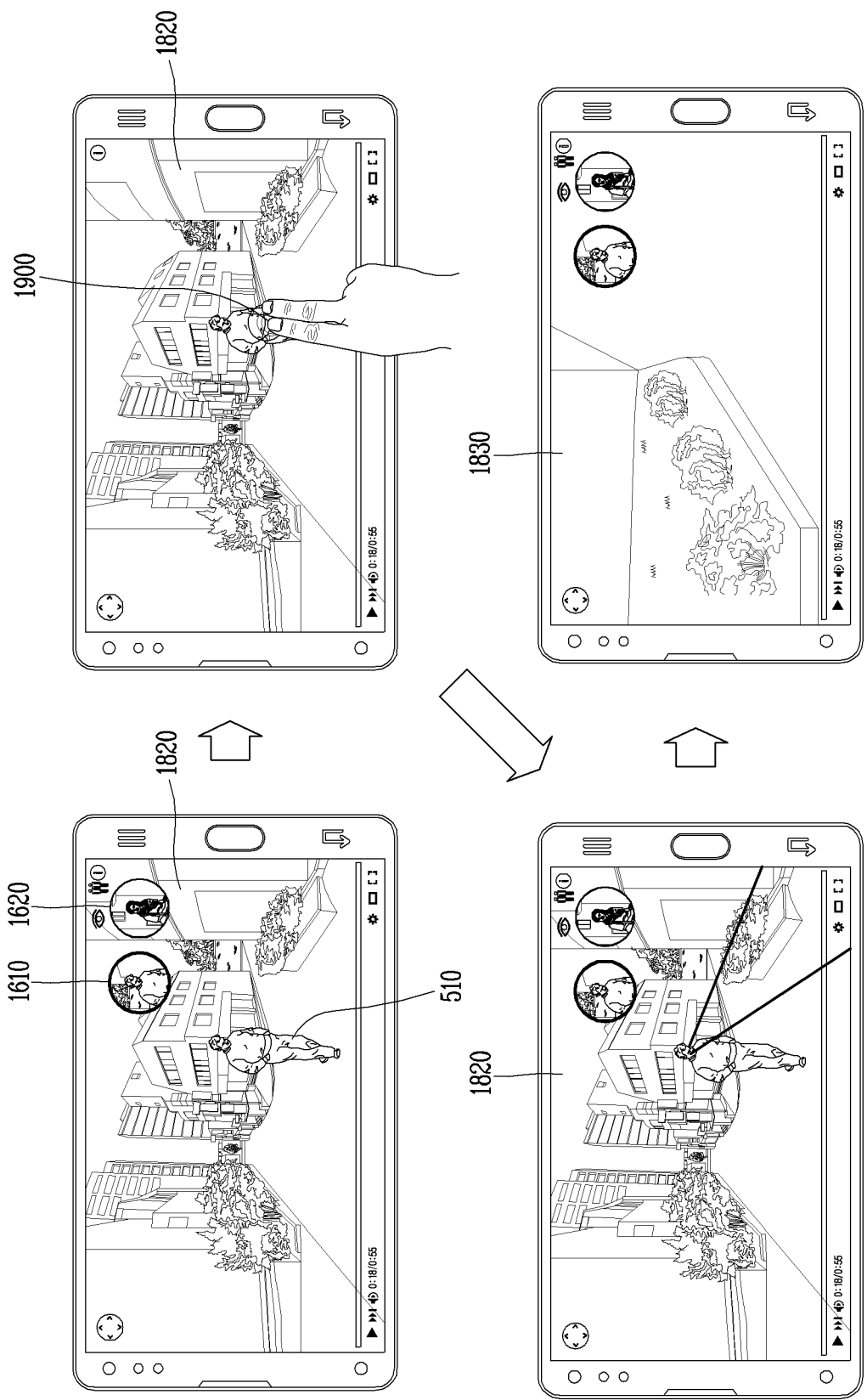
Figure 20:
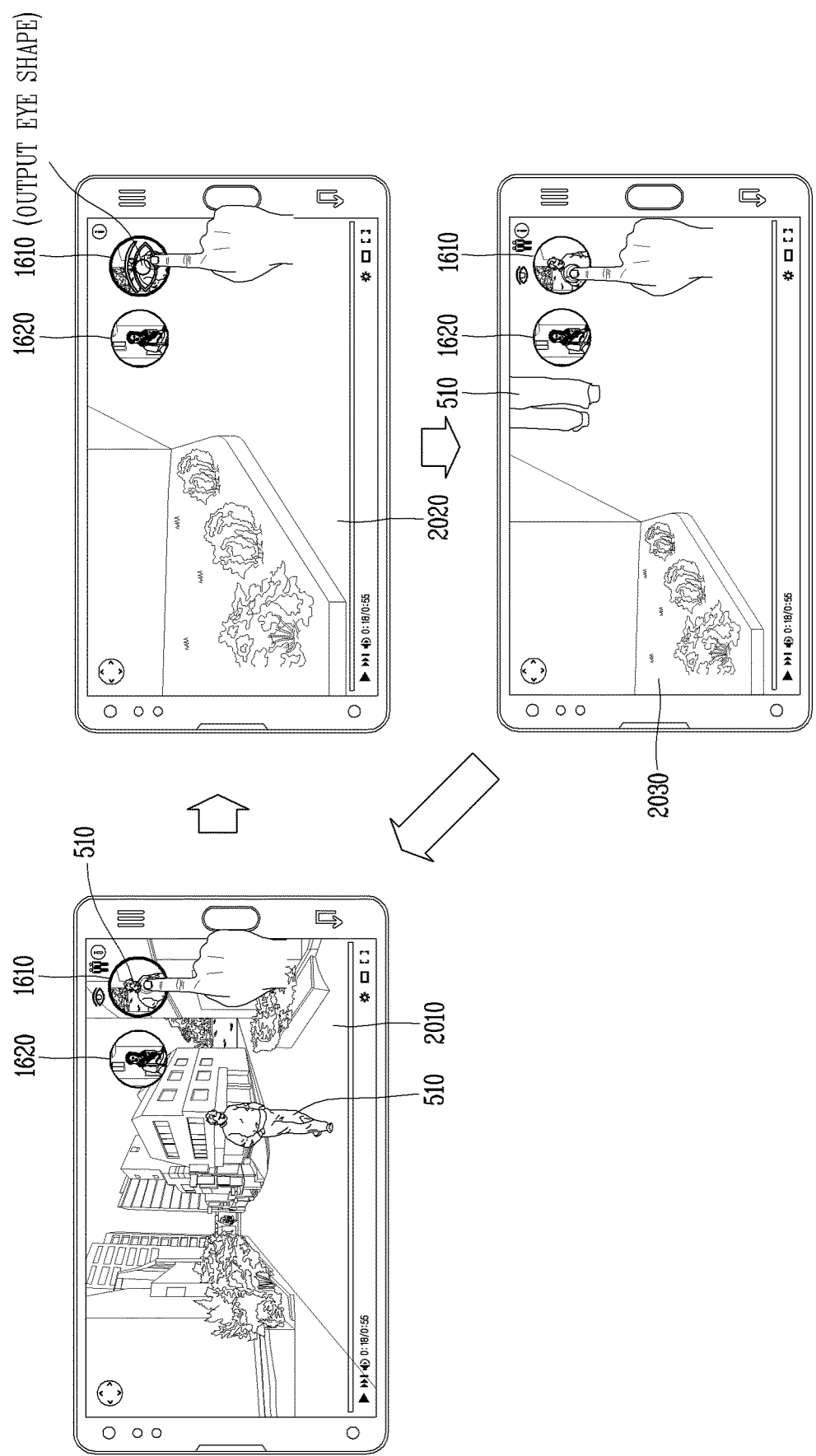

FIGS. 18 to 20 are conceptual views illustrating an embodiment in which a portion of an image corresponding to a gaze of a person is output.

Referring to FIG. 18, a touch input may be applied to a gaze icon 1810 while a portion A 1820 of the image tracking the first person 510 is being output on the entire screen 151. Accordingly, a region that the first person 510 views and the viewing angle of the image may be changed such that a portion 1830 of the image including the region can be output.

To calculate the region that the first person 510 views, the gaze direction (angle), the head direction (angle), the body direction (angle), the pointing direction (angle), etc. of the first person 510 may be calculated. At this time, the pointing direction may be a direction to which the first person 510 points with a finger or the like.

As another embodiment, referring to FIG. 19, a long touch input 1900 may be applied to the first person 510 with two fingers in a state in which a portion A 1820 of the image tracking the first person 510 is being output on the entire screen 151.

Accordingly, a region that the first person 510 views and the viewing angle of the image may be changed such that a portion 1830 of the image including the region can be output.

As aforementioned, to calculate the region that the first person 510 views, the gaze direction (angle), the head direction (angle), the body direction (angle), the pointing direction (angle), and the like of the first person 510 may be calculated. At this time, the pointing direction may be a direction to which the first person 510 points with a finger or the like.

As another embodiment, referring to FIG. 20, a touch input may be applied again to the first icon 1610 corresponding to the first person 510 in a state in which a portion A 2010 of the image tracking the first person 510 is being output on the entire screen 151.

Accordingly, the portion 2020 of the image corresponding to the gaze of the first person 510 may be output on the entire screen 151. In addition, an eye shape indicating that the portion 2020 of the image corresponding to the gaze of the first person 510 is being output may be output on the first icon 1610.

When a touch input is applied again to the first icon 1610, a portion 2030 of the image that was being output before the first person 510 was selected may be output again on the entire screen 151. Thereafter, when a touch input is applied again to the first icon 1610, the portion A 2010 of the image tracking the first person 510 may be output again on the entire screen 151.

That is, the portion of the image that was being output before the first person 510 was selected, the portion of the image that tracks the first person 510, and the portion of the image that corresponds to the gaze of the first person 510 may be output in a preset order or sequentially, in response to the consecutively applied touch inputs.

On the other hand, when a preset touch input is applied, the controller 180 may calculate an object associated with the first object based on at least one of the gaze direction, the head direction, the body direction, and the pointing direction of the first object, and automatically change the viewing angle of the image so that the portion of the image including the object is output.

As an embodiment related to FIGS. 18 to 20, the controller 180 may calculate the object that the first person 510 views and automatically change the viewing angle of the image such that the object is continuously output.

To calculate the object that the first person 510 views, the gaze direction (angle), the head direction (angle), the body direction (angle), the pointing direction (angle), and the like of the first person 510 may be calculated. At this time, the pointing direction may be a direction to which the first person 510 points with a finger or the like.

On the other hand, as an embodiment in which an icon corresponding to a person is output, icons corresponding to persons who have executed communications with a specific person may be output.

Figure 21:
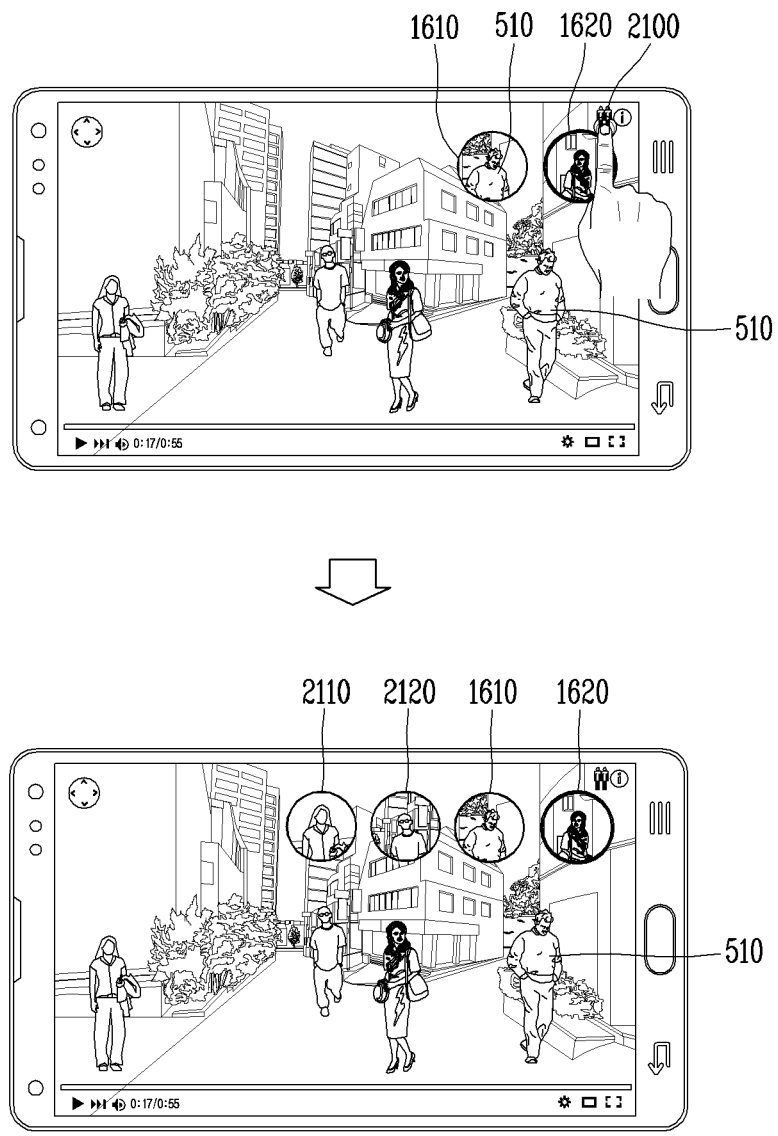
FIG. 21 is a conceptual view illustrating an embodiment in which icons corresponding to persons associated with a specific person are output.

FIG. 21 is a conceptual view illustrating an embodiment in which icons corresponding to persons associated with a specific person are output.

Referring to FIG. 21, a touch input may be applied to a friend icon 2100 while a portion of the image tracking the first person 510 is being output on the entire screen 151.

Accordingly, icons 2110 and 2120 corresponding to the persons associated with the first person 510 may be additionally output.

As an embodiment, icons corresponding to the persons communicating with the first person 510 may be output. Specifically, the icons 2110 and 2120 corresponding to persons who have shaken hands, exchanged greetings or communicated with the first person 510 may be additionally output.

Similarly, when a touch input is applied to one of the respective icons 2110 and 2120, a portion of the image tracking each person may be output on the entire screen 151 or one region of the screen 151.

As described above, a portion of an image that tracks a specific object may be output until the specific object disappears from the image or is reduced down to a preset size or less, or may be output for a preset time.

Figure 22:
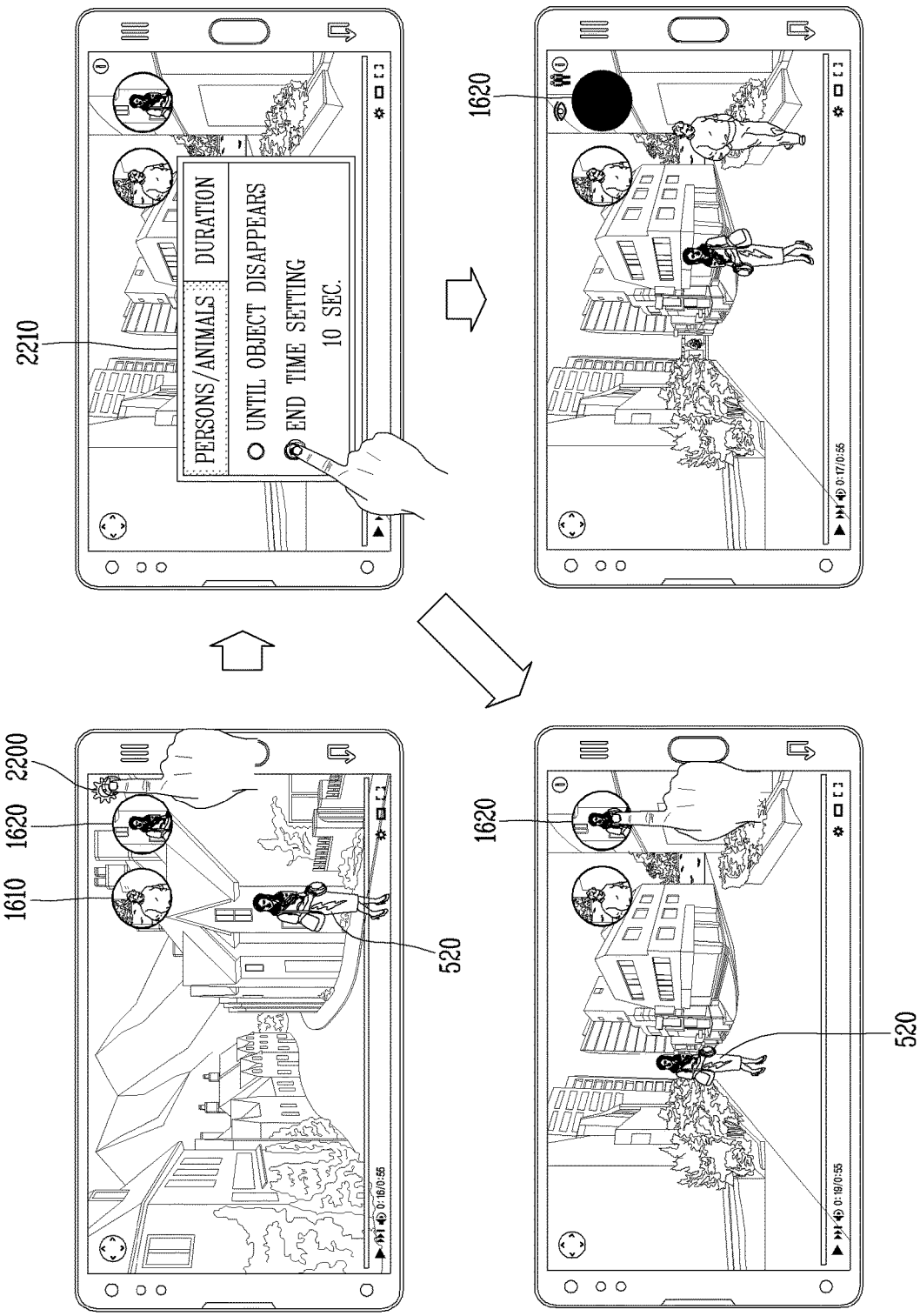
FIG. 22 is a conceptual view illustrating an embodiment of setting a time for which a portion of an image tracking a specific person is output.

FIG. 22 is a conceptual view illustrating an embodiment of setting a time for which a portion of an image tracking a specific person is output.

Referring to FIG. 22, when a touch input is applied to an environment setting icon 2200, an object and a pop-up window 2210 for selecting an output condition of a portion of the image tracking the object may be output.

As an embodiment, the portion of the image that tracks the object may be output until the corresponding object disappears or for a preset time. Specifically, the portion of the image that tracks the object may be set to be output for 10 seconds.

Thereafter, when the set time elapses, the second icon 1620 corresponding to a currently-output object (second person) may be blurred.

As another embodiment, when a touch input is applied to the second icon 1620 again before the set time elapses, the set time for outputting the portion of the image tracking the object may be extended. At this time, the time may be updated again by a preset time or an initially-set time (10 seconds).

On the other hand, when persons or animals are recognized in the image, icons corresponding to them may be output.

Figure 23:
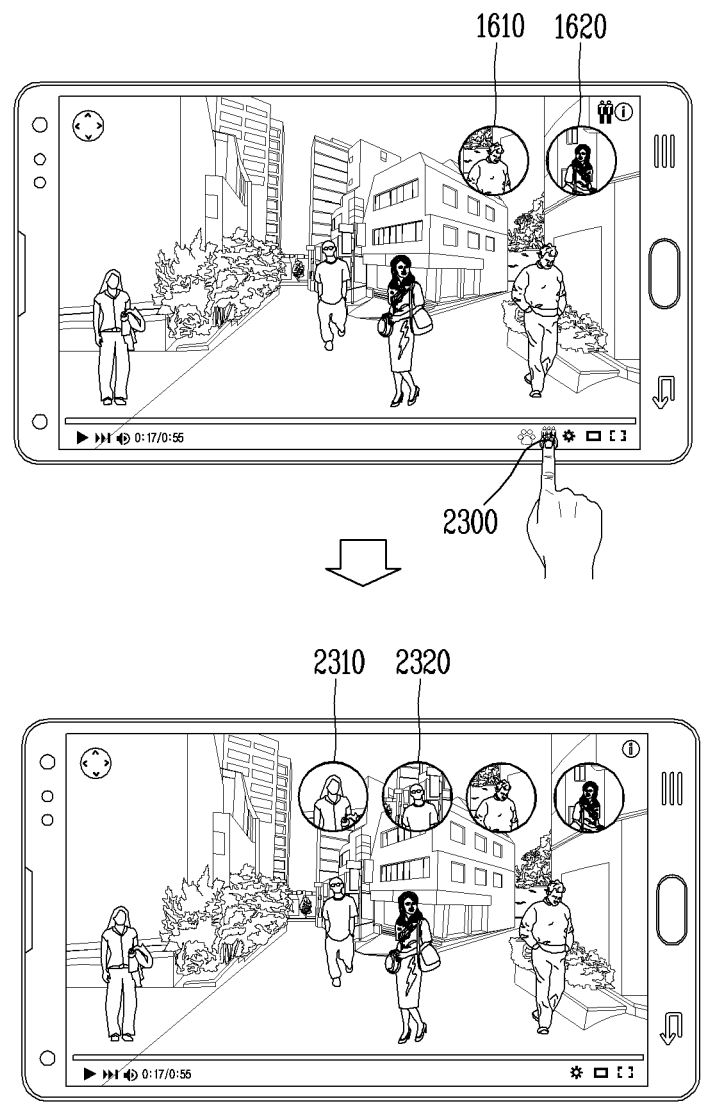
FIG. 23 is a conceptual view illustrating an embodiment in which an icon corresponding to a recognized person is output.

FIG. 23 is a conceptual view illustrating an embodiment in which an icon corresponding to a recognized person is output.

Referring to FIG. 23, when a touch input is applied to a person recognition icon 2300, at least one person included in the image may be recognized and icons 2310 and 2320 corresponding to the recognized at least one person may be additionally output.

Figure 24:
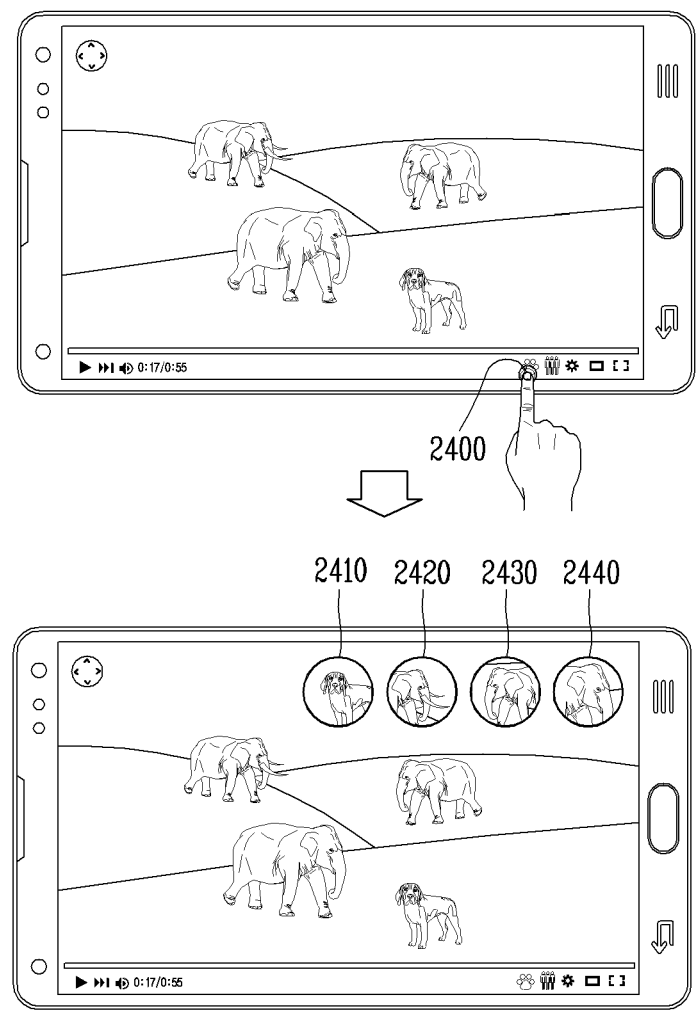
FIG. 24 is a conceptual view illustrating an embodiment in which an icon corresponding to a recognized animal is output.

FIG. 24 is a conceptual view illustrating an embodiment in which an icon corresponding to a recognized animal is output.

Referring to FIG. 24, when a touch input is applied to an animal recognition icon 2400, at least one animal included in the image may be recognized, and icons 2410, 2420, 2430, and 2440 corresponding to the recognized at least one animal may be additionally output.

At this time, conditions and ranges in which the persons and the animals are recognized may be preset.

Figure 25:
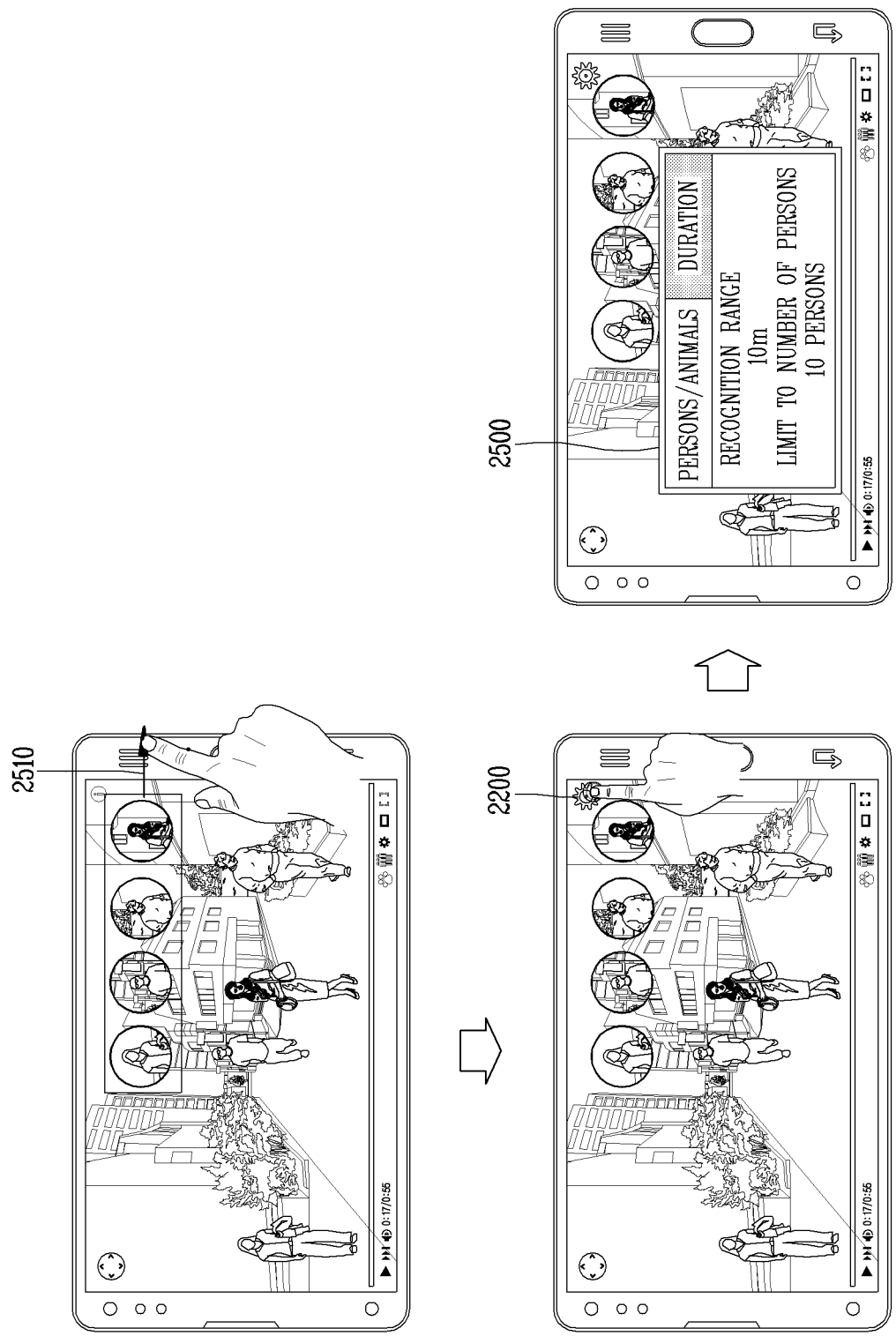
FIG. 25 is a conceptual view illustrating an embodiment of setting conditions of object recognition.

FIG. 25 is a conceptual view illustrating an embodiment of setting conditions of object recognition.

Referring to FIG. 25, when a scroll input 2510 to the left or right is applied to icons corresponding to persons recognized in the image, a list of icons may be turned over. Accordingly, when a plurality of persons is recognized, the persons may be searched for by turning the list of icons.

As another embodiment, when a touch input is applied to the environment setting icon 2200, a pop-up window 2500 for selecting an object recognition condition may be output.

For example, a recognition range may be input so that only persons within a preset radius and meters can be recognized. As another embodiment, a number of persons may be limited such that only a few persons can be recognized.

On the other hand, a portion of an image that tracks an object may be stored in a photo album like a normal image. As a result, such stored image portion may be transmitted to another terminal so as to enable sharing of a viewpoint with respect to a specific object.

Figure 26:
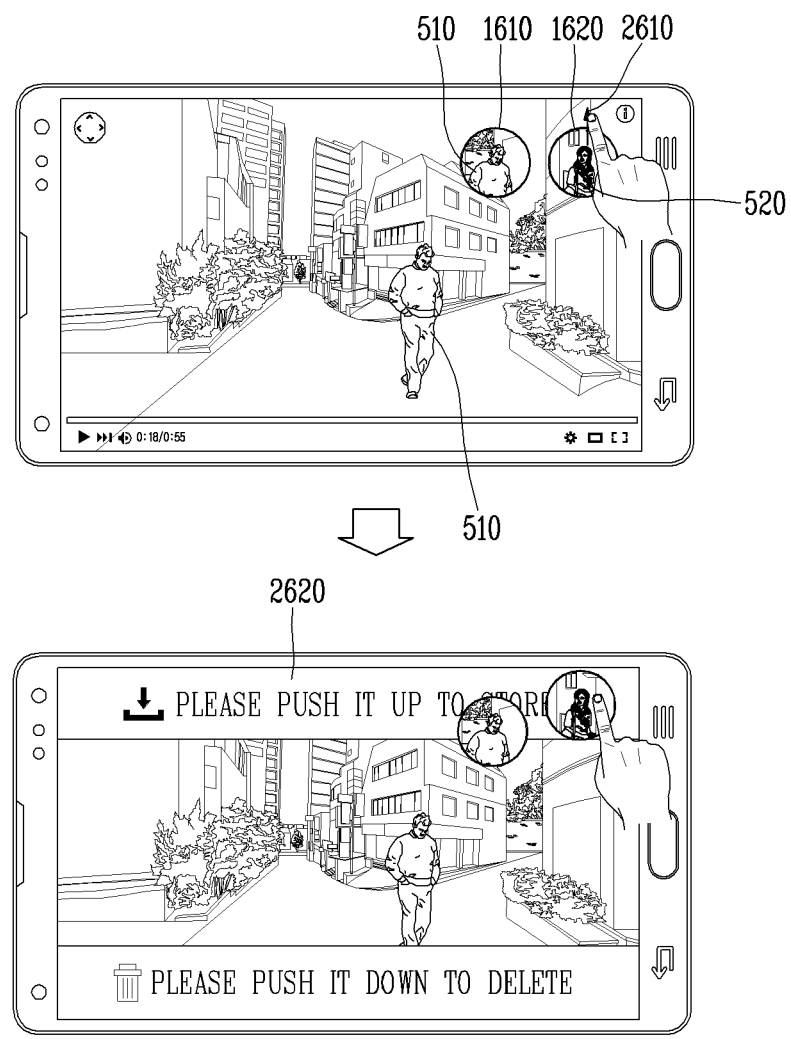
FIG. 26 is a conceptual view illustrating an embodiment in which a portion of an image tracking an object is stored.

FIG. 26 is a conceptual view illustrating an embodiment in which a portion of an image tracking an object is stored.

Referring to FIG. 26, an upward flicking input or drag input 2610 may be applied to the second icon 1620 corresponding to the second person 520. Accordingly, a message 2620 indicating that a portion B of the image tracking the second person 520 may be output on an upper portion of the screen 151.

As an embodiment, when a finger by which the drag input 2610 has been applied is released, the portion B of the image may be stored. As a result, the portion B of the image, in which the viewing angle of the image is automatically changed such that the second person 520 is output, may be stored as a separate file in the photo album.

Figure 27:
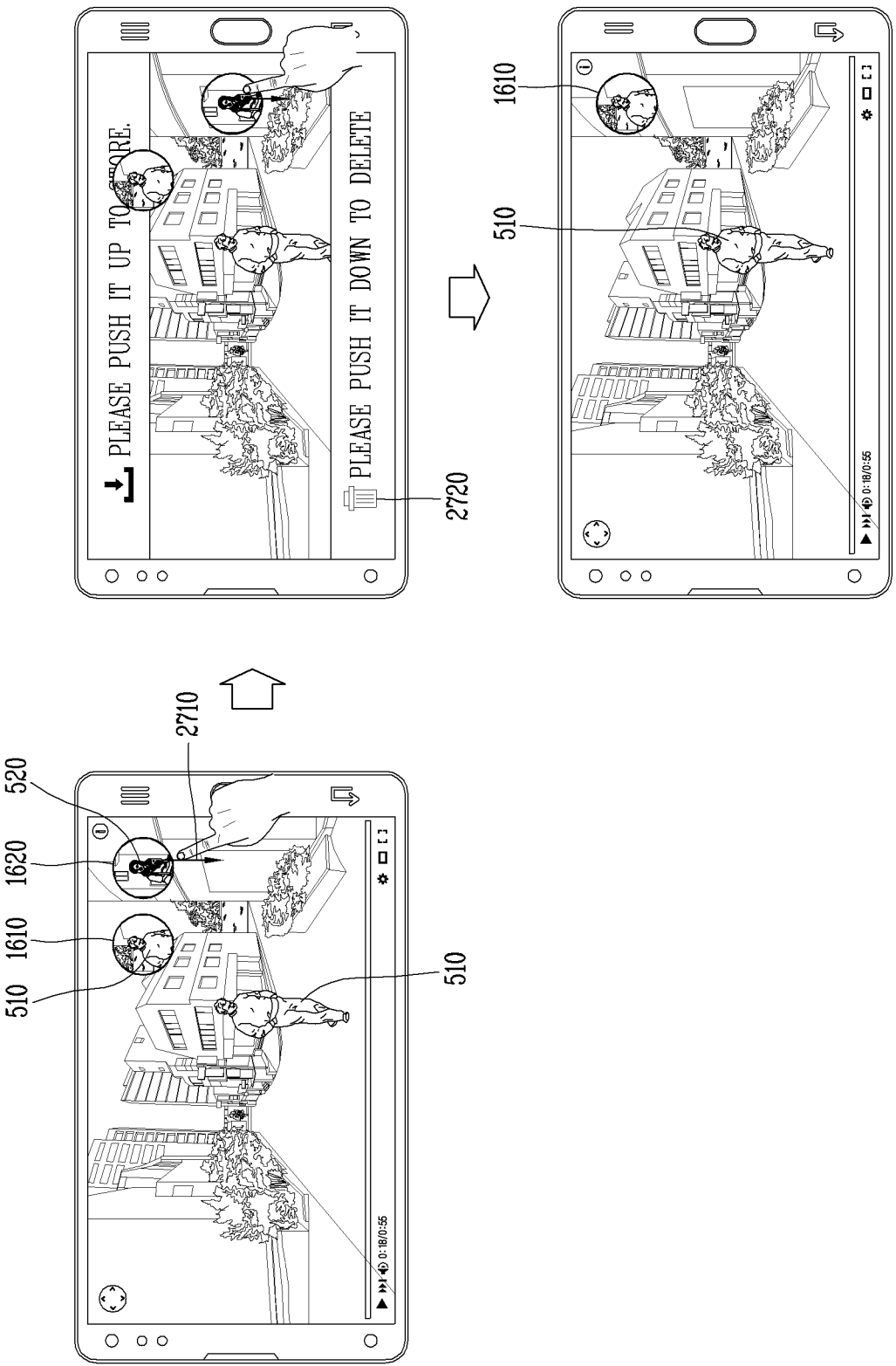
FIG. 27 is a conceptual view illustrating an embodiment in which a portion of an image tracking an object is deleted.

FIG. 27 is a conceptual view illustrating an embodiment in which a portion of an image tracking an object is deleted.

Referring to FIG. 27, a downward flicking input or drag input 2710 may be applied to the second icon 1620 corresponding to the second person 520. Accordingly, a message 2720 indicating that the portion B of the image tracking the second person 520 is deleted may be output on a lower portion of the screen 151.

As an embodiment, when a finger by which a drag input 2710 has been applied is released, a portion B of the image which is temporarily stored may be deleted. As a result, the second icon 1620 disappears from the screen 151.

Figure 28:
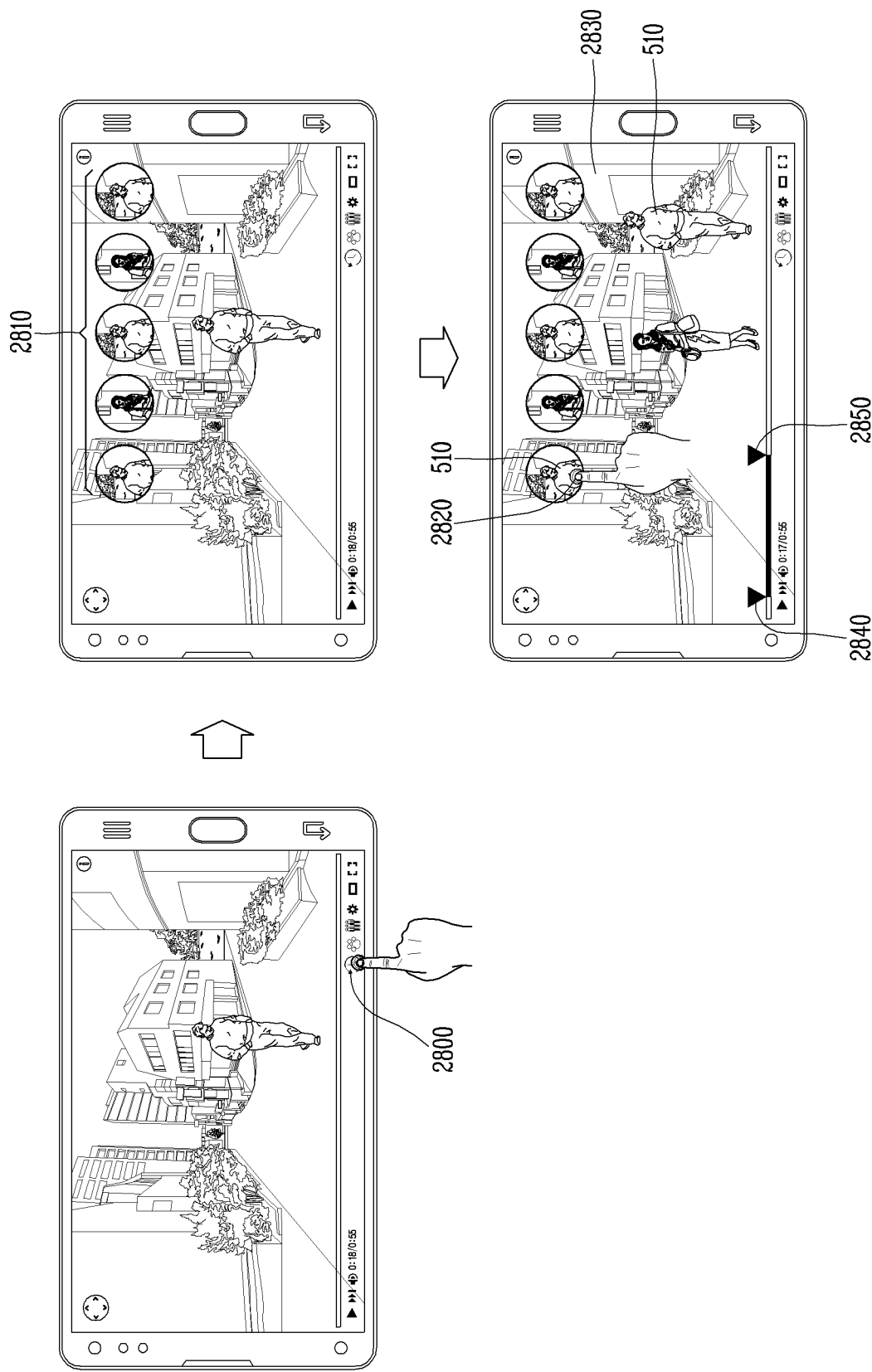
FIG. 28 is a conceptual view illustrating an embodiment of checking a portion of an image tracking a previously-reproduced object.

FIG. 28 is a conceptual view illustrating an embodiment of checking a portion of an image tracking a previously-reproduced object.

Referring to FIG. 28, when a touch input is applied to a history icon 2800, icons 2810 corresponding to objects which have previously been output as the portion of the image tracking the object may be output. As an embodiment, the user may search for a list of icons which are being output by applying a flicking or drag input to the left and right.

Among others, when a touch input is applied to a first icon 2820 corresponding to the first person 510, a portion A 2830 of the image tracking the first person 510 may be output on the entire screen 151.

As another embodiment, a start time point 2840 and an end time point 2850 of the portion A 2830 of the image may be displayed on a reproduction bar of the image at the time of outputting the portion A 2830 of the image. That is, a portion of the image in which the first person 510 is continuously included may be displayed.

On the other hand, the controller 180 may output an angle state bar indicating a change in the viewing angle of the first portion, and change the viewing angle of the first portion in response to a preset touch input being applied to the angle state bar.

Figure 29:
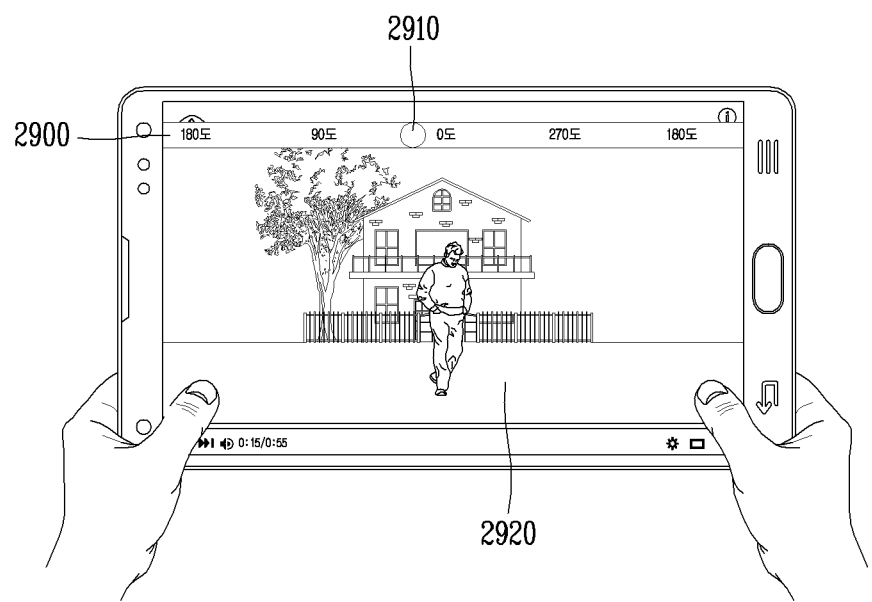
FIG. 29 is a conceptual view illustrating an embodiment in which an angle state bar is output.

FIG. 29 is a conceptual view illustrating an embodiment in which an angle state bar is output.

Referring to FIG. 29, when a gesture of tilting the terminal 100 is applied for a preset time to change the viewing angle of the image, the angle state bar 2900 may be output.

As an embodiment, when a touch input is applied to the viewing angle setting icon 410 illustrated in FIG. 4 for a preset time, the angle state bar 2900 may be output.

A viewing angle of the image which can be set may be displayed on the angle state bar 2900. In addition, an angle display icon 2910 may be output at an angle corresponding to a viewing angle of an image portion 2920 currently being output.

As another embodiment, when a gesture of tilting the terminal 100 is not applied or a touch input is not applied to the angle setting icon 410 for a preset time, the angle state bar 2900 disappears from the screen 151.

As another embodiment, when a preset touch input such as a short touch input or a double tap input is applied to the portion 2920 of the image currently being output, the angle state bar 2900 disappears from the screen 151.

Figure 30:
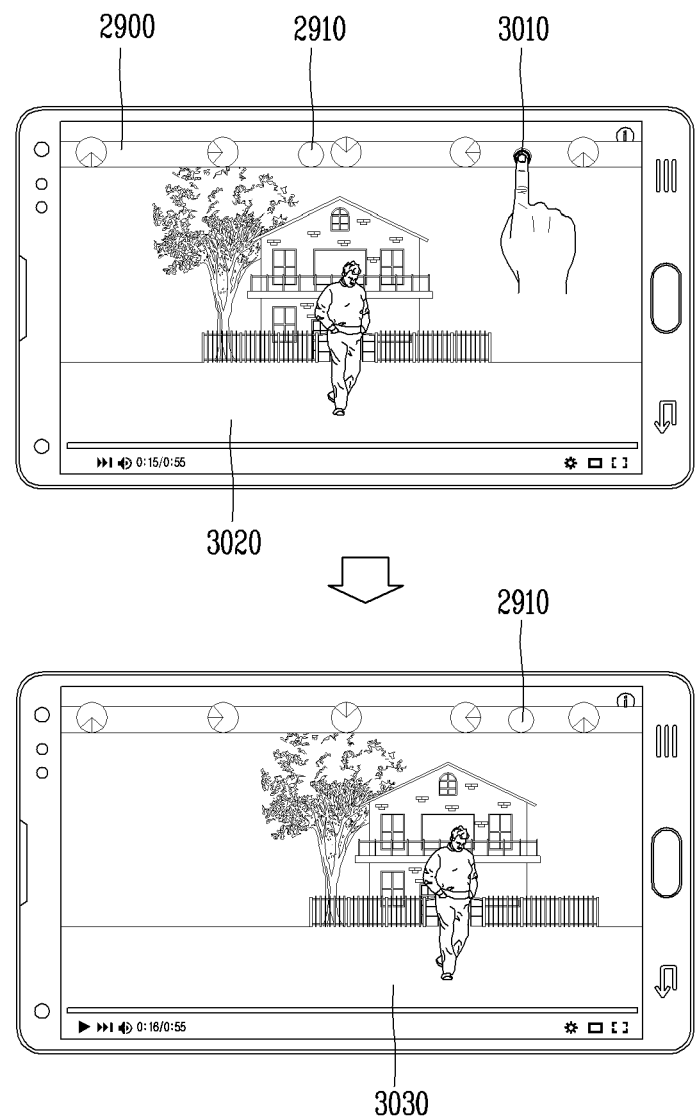
FIGS. 30 and 31 are conceptual views illustrating an embodiment in which a viewing angle is changed by applying a touch input to an angle state bar.
Figure 31:
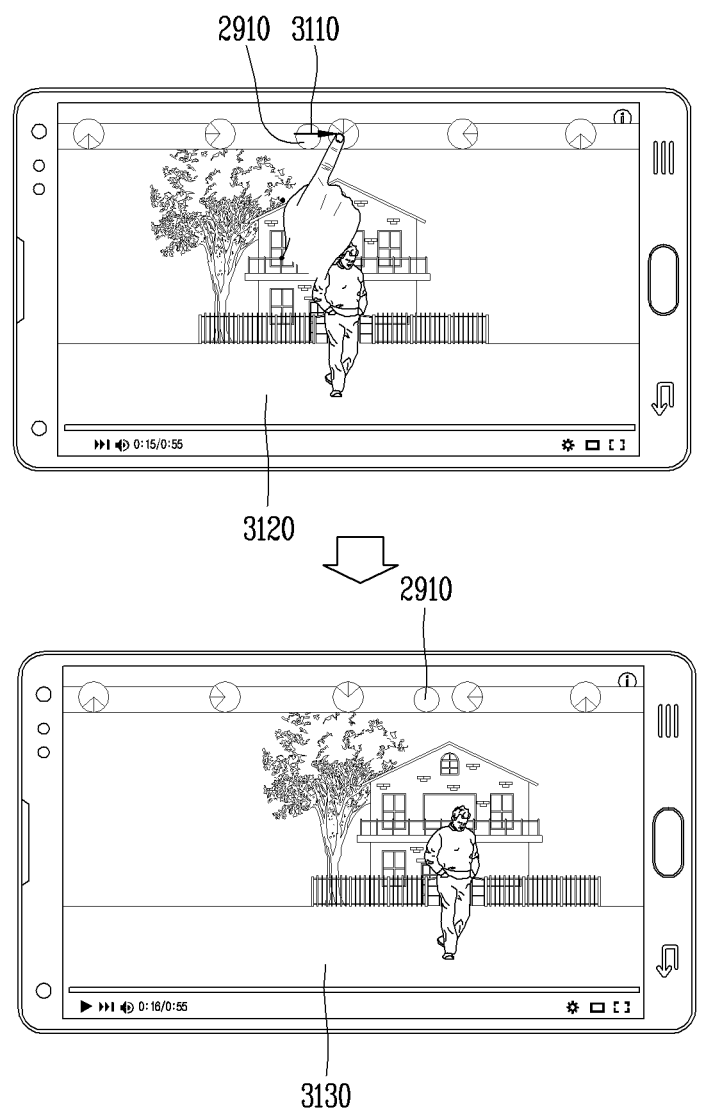

FIGS. 30 and 31 are conceptual views illustrating an embodiment in which a viewing angle is changed by applying a touch input to an angle state bar.

Referring to FIG. 30, the viewing angle displayed on the angle state bar 2900 may be represented by a figure corresponding to an angle as well as a number. In addition, a touch input may be applied to a point 3010 corresponding to a specific angle displayed on the angle state bar 2900.

Accordingly, the angle display icon 2910 may be moved to the corresponding point 3010, and a viewing angle of an image portion 3020 being output may be switched to the corresponding angle.

As another embodiment, referring to FIG. 31, when a drag input is applied to the angle display icon 2910, the viewing angle of the image may be changed according to a direction, a speed, a degree (distance) and the like that the drag input is applied. At this time, a portion of the image in which the viewing direction is shifted may be continuously output for a preset time or by a preset degree (angle).

As an embodiment, when a drag input 3110 to the right is applied, a current viewing direction is continuously shifted to the right. As a result, images 3130 whose viewing direction is shifted to the right may be continuously output for a preset time or by a preset degree (angle).

As another embodiment, the current viewing direction is shifted to the right continuously, in proportion to a speed at which the drag input 3110 is applied. As a result, the images 3130 whose viewing direction is shifted to the right may be continuously output at the speed for a preset time or by a preset degree (angle).

As another embodiment, the current viewing direction is continuously shifted to the right, in proportion to a distance by which the drag input 3110 is applied. Specifically, when the distance by which the drag input is applied becomes longer, a capturing direction of the image 3120 is shifted further to the right.

Figure 32:
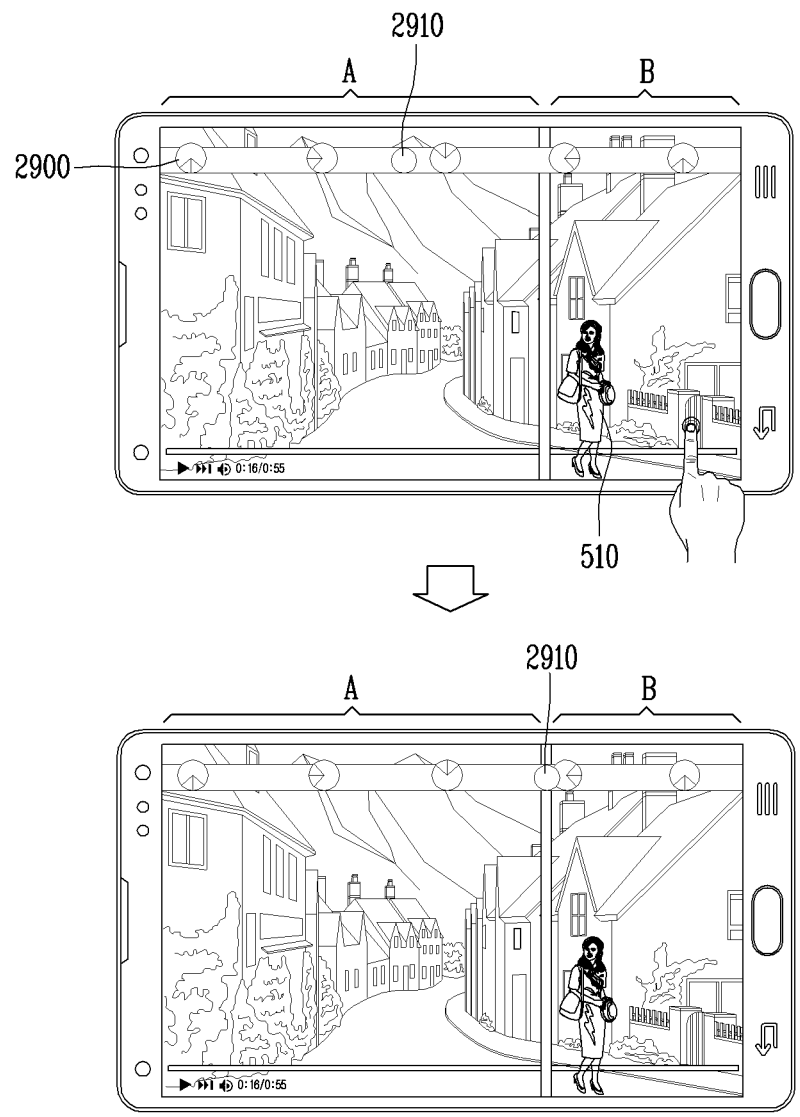
FIG. 32 is a conceptual view illustrating an embodiment in which a viewing angle of a portion of an image tracking an object is output in an angle state bar.

FIG. 32 is a conceptual view illustrating an embodiment in which a viewing angle of a portion of an image tracking an object is output in an angle state bar.

Referring to FIG. 32, as described above, the screen 151 may be split into a first region A in which a portion of an image with respect to a set viewing angle is output, and a second region B in which a portion A of the image tracking the first person 510 is output. In addition, an angle state bar 2900 and an angle display icon 2910 for displaying the viewing angle of the image may be output.

As an embodiment, the angle display icon 2910 may indicate a viewing angle of the portion of the image with respect to the set viewing angle, which is being output on the first region A. In this state, when a touch input is applied to the second region B, a position of the angle display icon 2910 may be changed to indicate the viewing angle of the portion A. In addition, a border color of the second region B may be changed to indicate that the angle display icon 2910 is indicating the current viewing angle of the portion A.

On the other hand, when a gesture of continuously changing the viewing angle in one direction is applied, an indicator for adjusting this may be output.

Figure 33:
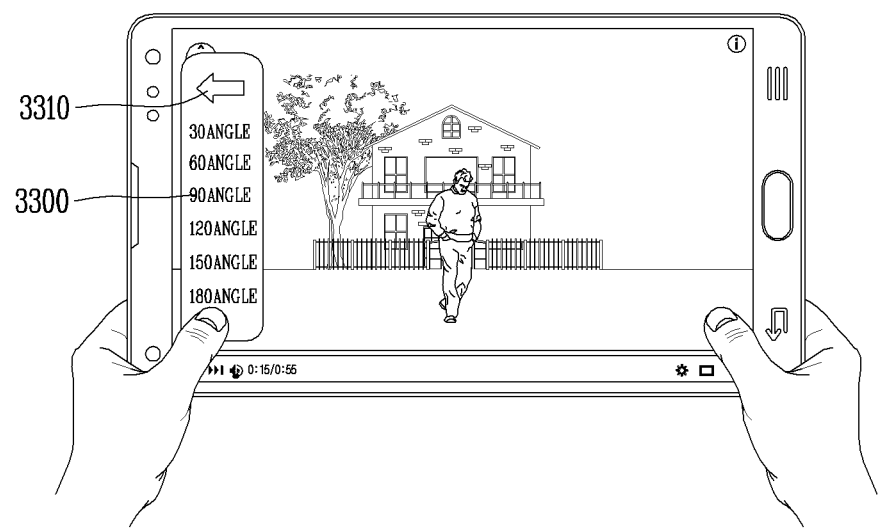
FIG. 33 is a conceptual view illustrating an embodiment in which an indicator for setting an angle is output.

FIG. 33 is a conceptual view illustrating an embodiment in which an indicator for setting an angle is output.

Referring to FIG. 33, when a gesture of tilting the terminal 100 to change a viewing angle of an image portion in one direction is applied for a preset time, a pop-up window 3300 for changing the viewing angle continuously in the tilted direction may be output.

As an embodiment, when the terminal 100 is continuously tilted to the left for a preset time, the pop-up window 3300 for setting the viewing direction may be output on the left side of the screen 151. Similarly, when the terminal 100 is continuously tilted to the right for a preset time, the pop-up window for setting the viewing direction may be output on the right side of the screen 151.

As another embodiment, when a touch input is applied to a left arrow 3310 currently output on the pop-up window 3300, the viewing angle may be continuously changed to the left while the touch input is applied.

As another embodiment, when a touch input is applied to one of angles output on the pop-up window 3300, the viewing angle of the image may be changed to the corresponding angle.

As another embodiment, the pop-up window 3300 disappears from the screen 151 when a gesture of tilting the terminal 100 is not applied for a preset time, when a touch input is not applied to the screen 151 for a preset time, when a preset touch input such as a short touch input or a double tap input is applied to a currently-output image portion, when the terminal 100 is tilted to an opposite direction, and the like.

As another embodiment, when a drastic change in the angle of tilting the terminal 100 is detected, the terminal 100 may output vibration. Accordingly, an image environment similar to an actual environment can be provided.

Hereinafter, effects of a mobile terminal and a method of controlling the same according to the present invention will be described.

According to at least one of embodiments of the present invention, a viewing angle of an image can be set simply and easily.

Further, according to at least one of embodiments of the present invention, a viewing angle of an image can be automatically changed based on a specific object (object). This may result in overcoming inconvenience in having to set a viewing angle of an image in detail.

Then, a portion of the image with respect to a set viewing angle can be stored, reproduced or transmitted as a general image. As a result, a specific viewpoint with respect to the image can be shared.

The present invention can be implemented as computer-readable codes in a program-recorded medium. The computer-readable media may include every type of recording device in which data readable by a computer system is stored. Examples of the computer-readable media may include a hard disk drive (HDD), a solid state disk (SSD), a silicon disk drive (SDD), ROM, RAM, CD-ROM, a magnetic tape, a floppy disk, an optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A mobile terminal, comprising:
   a display unit configured to display an image of which a viewing angle is changeable; and
   a controller configured to:
   change the viewing angle of the displayed image in response to a user viewing change input, and
   in response to a user selection of a first object included in the image, automatically change the viewing angle of the image such that the first object included in the image is displayed on the display unit while the viewing angle is changed,
   wherein the controller is further configured to:
   when the first object is a moving object, change the viewing angle of the image such that the moving object is tracked, and
   when a preset user input is applied to the image, split into a first region on the right side and a second region on a left side and output a first portion of the image including the first object to the first region, and a second portion of the image including the first object to the second region, and
   wherein the first portion of the image including the first object is changed by a user input and output in the first region, and the second portion of the image including the first object is automatically changed and output in the second region.

2. The mobile terminal of claim 1, wherein the controller is further configured to:
   display an icon for changing the viewing angle of the displayed image, and
   wherein the user viewing change input includes a preset touch input applied to the icon.

3. The mobile terminal of claim 1, wherein the controller is further configured to:
   automatically change the viewing angle of the image such that a first portion of the image including the first object is displayed.

4. The mobile terminal of claim 3, wherein the controller is further configured to:
   stop displaying the first portion, in response to the first object being displayed in a preset size or less while the first portion is displayed.

5. The mobile terminal of claim 3, wherein the controller is further configured to:
   in response to a user selection of a second object included in the image, automatically change the viewing angle of the image such that a second portion of the image including the second object is displayed.

6. The mobile terminal of claim 3, wherein the controller is further configured to:
   display a reproduction time corresponding to the first portion on a reproduction bar of the image.

7. The mobile terminal of claim 3, wherein the controller is further configured to:
   in response to the user selection of the first object, display the first portion in one area of the display unit and display the image without automatically changing the viewing angle of the image.

8. The mobile terminal of claim 3, wherein the controller is further configured to:
   display the first portion on an upper layer of the image being displayed on an entire region of the display unit, in response to the user selection of the first object.

9. The mobile terminal of claim 8, wherein the controller is further configured to:
   change a display position of the upper layer or a size of the upper layer, in response to a preset touch input applied to the upper layer.

10. The mobile terminal of claim 8, wherein the controller is further configured to:
    zoom in or zoom out the first portion, in response to a preset touch input applied to the upper layer.

11. The mobile terminal of claim 3, wherein the controller is further configured to:
    display a plurality of icons corresponding to a plurality of objects included in the image, respectively, and
    in response to a preset touch input applied to a first icon included in the plurality of icons, display a portion of the image including an object corresponding to the first icon.

12. The mobile terminal of claim 3, wherein the controller is further configured to:
    calculate a region associated with the first object based on at least one of a gaze direction, a head direction, a body direction and a pointing direction of the first object, in response to a preset user input, and
    change the viewing angle of the image such that a portion of the image including the calculated region is displayed.

13. The mobile terminal of claim 12, wherein the controller is further configured to:
    calculate an object associated with the first object based on at least one of the gaze direction, the head direction, the body direction and the pointing direction of the first object, in response to a preset user input, and
    automatically change the viewing angle of the image such that a portion of the image including the object is output.

14. The mobile terminal of claim 3, wherein the controller is further configured to:
    display an angle state bar indicating a change in the viewing angle of the first portion, and
    change a viewing angle of the first portion, in response to a preset touch input applied to the angle state bar.

15. A method of controlling a mobile terminal, the method comprising:
    displaying, via a display unit of the mobile terminal, an image of which a viewing angle is changeable;

changing, via a controller of the mobile terminal, the viewing angle of the displayed image in response to a user viewing change input; and in response to a user selection of a first object included in the image, automatically changing, via the controller, the viewing angle of the image such that the first object included in the image is displayed on the display unit while the viewing angle is changed, wherein the method further comprises:

when the first object is a moving object, changing the viewing angle of the image such that the moving object is tracked, and when a preset user input is applied to the image, splitting into a first region on the right side and a second region on a left side; and outputting a first portion of the image including the first object to the first region, and a second portion of the image including the first object to the second region, and wherein the first portion of the image including the first object is changed by a user input and output in the first region, and the second portion of the image including the first object is automatically changed and output in the second region.

16. The method of claim 15, further comprising:

displaying an icon for changing the viewing angle of the displayed image, wherein the user viewing change input includes a preset touch input applied to the icon.

17. The method of claim 15, further comprising:

automatically changing the viewing angle of the image such that a first portion of the image including the first object is displayed.

18. The method of claim 17, further comprising:

stopping displaying the first portion, in response to the first object being displayed in a preset size or less while the first portion is displayed.

19. The method of claim 17, further comprising:

in response to a user selection of a second object included in the image, automatically changing the viewing angle of the image such that a second portion of the image including the second object is displayed.

20. The method of claim 17, wherein the controller is further configured to:

display a reproduction time corresponding to the first portion on a reproduction bar of the image.

* * * * *